US009875068B2

(12) United States Patent
Tokiwa

(10) Patent No.: US 9,875,068 B2
(45) Date of Patent: Jan. 23, 2018

(54) INFORMATION PROCESSING SYSTEM, INFORMATION PROCESSING APPARATUS, AND INFORMATION PROCESSING METHOD FOR FACILITATING JOB PARAMETER SETTING

(71) Applicant: Masafumi Tokiwa, Kanagawa (JP)

(72) Inventor: Masafumi Tokiwa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/271,376

(22) Filed: Sep. 21, 2016

(65) Prior Publication Data

US 2017/0090827 A1   Mar. 30, 2017

(30) Foreign Application Priority Data

Sep. 29, 2015   (JP) .................................. 2015-191764
Sep. 29, 2015   (JP) .................................. 2015-191766
Aug. 19, 2016   (JP) .................................. 2016-161471

(51) Int. Cl.
  *G06F 3/12*   (2006.01)
  *H04N 1/00*   (2006.01)

(52) U.S. Cl.
  CPC .......... *G06F 3/1204* (2013.01); *G06F 3/1253* (2013.01); *H04N 1/00973* (2013.01); *H04N 2201/0094* (2013.01)

(58) Field of Classification Search
  CPC .................................................... G06F 3/1204
  USPC ........................................................ 358/1.15
  See application file for complete search history.

(56) References Cited

U.S. PATENT DOCUMENTS

| 9,124,733 | B2 | 9/2015 | Ando | |
| 2010/0245909 | A1* | 9/2010 | Yamaguchi | ........... G06F 3/1204 358/1.15 |
| 2011/0242599 | A1* | 10/2011 | Ohara | ............... H04L 29/12113 358/1.15 |
| 2012/0023451 | A1* | 1/2012 | Kuroyanagi | .............. G06F 8/38 715/835 |
| 2014/0016165 | A1* | 1/2014 | Ando | ................. H04N 1/00244 358/403 |
| 2016/0165076 | A1 | 6/2016 | Tokiwa et al. | |

FOREIGN PATENT DOCUMENTS

| JP | 2014-032659 | 2/2014 |
| JP | 2016-111702 | 6/2016 |

* cited by examiner

*Primary Examiner* — Jacky X Zheng
(74) *Attorney, Agent, or Firm* — IPUSA, PLLC

(57) ABSTRACT

An information processing system includes an information processing apparatus including a first processor configured to execute a first process, and an electronic apparatus connected via a network to the information processing apparatus and including a second processor configured to execute a second process. The first process includes identifying a location of a setting information file, which contains setting information used to execute a job at the electronic apparatus, based on hierarchical information indicating a hierarchical structure of files stored in a service providing system, obtaining the setting information from the setting information file in the identified location, and sending the obtained setting information to the electronic apparatus. The second process includes applying the setting information received from the information processing apparatus to a setting of the job to be executed at the electronic apparatus.

14 Claims, 36 Drawing Sheets

| | APPLICATION LIST SPREADSHEET ☆ 🗁 | | | | | | | |
|---|---|---|---|---|---|---|---|---|
| | FILE  EDIT  VIEW  INSERT  FORMAT  DATA  TOOLS  ADD-ON   HELP   ALL CHANGES HAVE BEEN SAVED IN DRIVE | | | | | | | |
| | 🗇 ← → 〒  ¥ % .0 .00 123▼  Arial   ▼   10 ▼   B  *I*  💲 A ▼   OTHERS▼ | | | | | | | |
| fx | | | | | | | | |
| | A | B | C | D | E | F | G | H |
| 1 | LABEL | APPLICATION URL | | | | | | |
| 2 | SCAN | https://ZZZ.com/scan | | | | | | |
| 3 | PRINT | https://ZZZ.com/print | | | | | | |
| 4 | FAX | https://ZZZ.com/fax | | | | | | |
| 5 | | | | | | | | |
| 6 | | | | | | | | |

FIG.7

| APPLICATION LIST SPREADSHEET ☆ |
|---|

| FILE | EDIT | VIEW | INSERT | FORMAT | DATA | TOOLS | ADD-ON | HELP | ALL CHANGES HAVE BEEN SAVED IN DRIVE |
|---|---|---|---|---|---|---|---|---|---|

| ⌐ | ↶ ↷ | ¥ | % | .0 | .00 | 123▼ | Arial | 10 ▼ | B | I | S | A ▼ | OTHERS ▼ | fx |

| | A | B | C | D | E | F | G | H |
|---|---|---|---|---|---|---|---|---|
| 1 | LABEL | APPLICATION URL | | | | | | |
| 2 | SCAN | https://ZZZ.com/scan | | | | | | |
| 3 | PRINT | https://ZZZ.com/print | | | | | | |
| 4 | FAX | https://ZZZ.com/fax | | | | | | |
| 5 | | | | | | | | |
| 6 | | | | | | | | |

FIG.8

| | SCAN APPLICATION SETTING SPREADSHEET ☆ ☐ | | | | | | |
|---|---|---|---|---|---|---|---|
| | FILE EDIT VIEW INSERT FORMAT DATA TOOLS ADD-ON HELP ALL CHANGES HAVE BEEN SAVED IN DRIVE | | | | | | |
| | ⎚ ↶ ↷ ⎚ ¥ % .0_ .00 123▼ Arial ▼ 10 ▼ B I S A▼ OTHERS▼ | | | | | | |
| fx | | | | | | | |
| | A | B | C | D | E | F | G |
| 1 | LABEL | FORMAT | SCAN COLOR | RESOLUTION | OCR | STORAGE LOCATION | |
| 2 | ESTIMATE | PDF | COLOR | 300 dpi | NO | http://ZZZ.com/folderid/qwertyuiop | |
| 3 | ORDER | PDF | MONOCHROME | 300 dpi | YES | http://ZZZ.com/folderid/asdfghjkl | |
| 4 | CONTRACT | PDF | COLOR | 200 dpi | NO | http://ZZZ.com/folderid/zxcvbnm | |
| 5 | | | | | | | |
| 6 | | | | | | | |

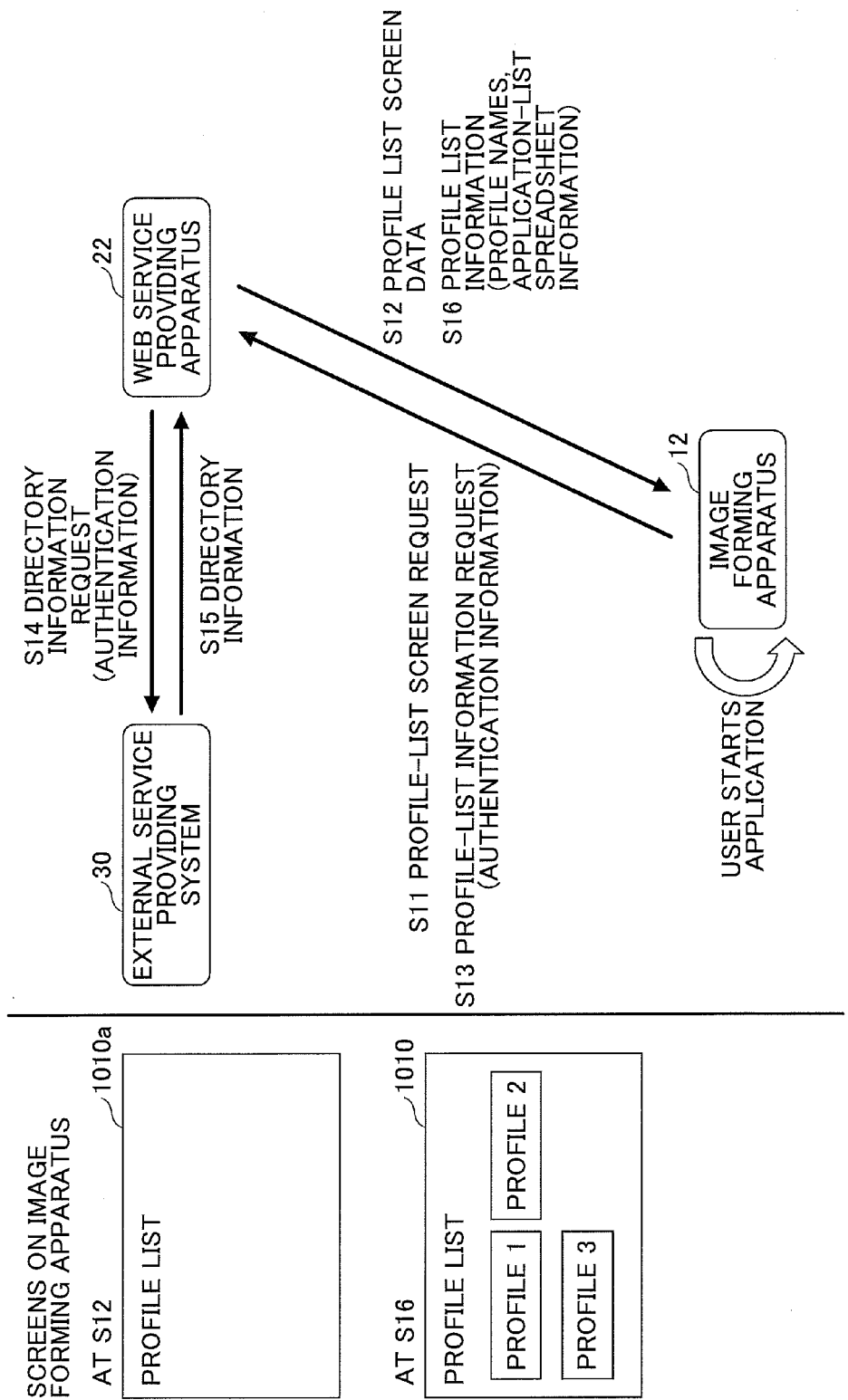

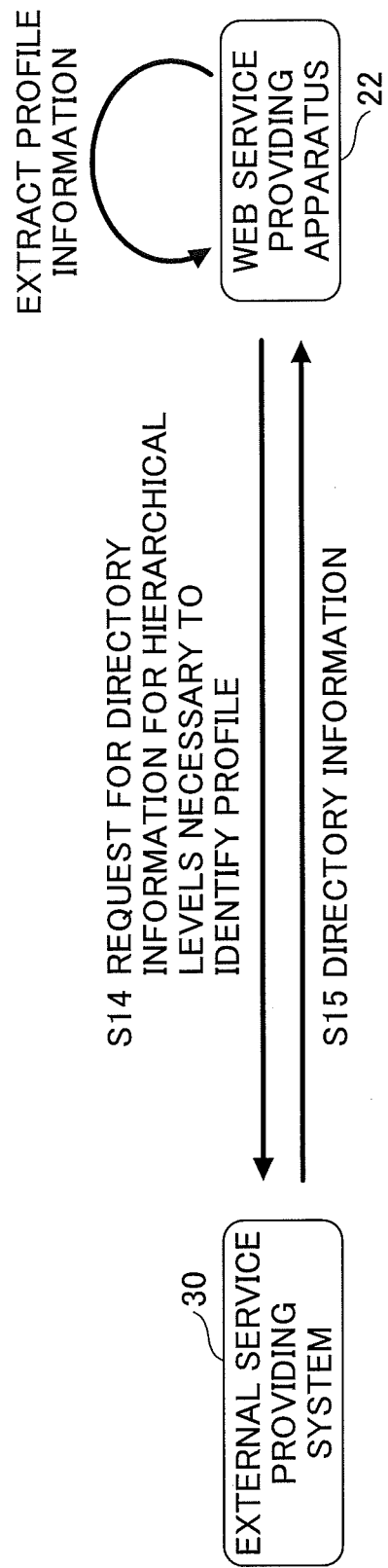

FIG.11

(A) DIRECTORY INFORMATION

```
{
 "results":{
  "id":"rootFolderId",
  "name":"EXTERNAL STORAGE ROOT FOLDER",
  "children":[
   {
    "id":"appFolder",
    "name":"APPLICATION FOLDER",
    "children":[
     {
      "id":"profileFolderId",
      "name":"PROFILE 1",
      "children":[
       {
        "id":"appSheet1",
        "name":"APPLICATION LIST SPREADSHEET",
        "children":null
       },
       {
        "id":"scanAppSheet",
        "name":"SCAN APPLICATION SETTING SPREADSHEET",
        "children":null
       },
       {
        ...
       }
      ]
     },
     {
      "id":"profileFolderId",
      "name":"PROFILE 2",
      "children":[
       {
        "id":"appSheet2",
        "name":"APPLICATION LIST SPREADSHEET",
        "children":null
       },
       {
        ...
       }
      ]
     },
     {
      "id":"profileFolderId",
      "name":"PROFILE 3",
      "children":[
       {
        ...
       }
      ]
     }
    ]
   },
   {
    "id":"anotherFolder",
    "name":"anotherFolder",
    "children":null
   }
  ]
 }
}
```

(B) EXTRACTED PROFILE INFORMATION

```
{
 "results": [
  {
   "profileName": "PROFILE 1",
   "sheetId": "appSheet1"
  },
  {
   "profileName": "PROFILE 2",
   "sheetId": "appSheet2"
  },
  {
   ...
  }
 ]
}
```

FIG.35

| | A | B | C | D | E | F | G | H |
|---|---|---|---|---|---|---|---|---|
| 1 | LABEL | APPLICATION URL | | | | | | |
| 2 | SCAN | | | | | | | |
| 3 | PRINT | | | | | | | |
| 4 | FAX | | | | | | | |
| 5 | | | | | | | | |
| 6 | | | | | | | | |

APPLICATION LIST SPREADSHEET

FILE  EDIT  VIEW  INSERT  FORMAT  DATA  TOOLS  ADD-ON  HELP  ALL CHANGES HAVE BEEN SAVED IN DRIVE

FIG.36

SCAN APPLICATION SETTING SPREADSHEET

| FILE | EDIT | VIEW | INSERT | FORMAT | DATA | TOOLS | ADD-ON | HELP | ALL CHANGES HAVE BEEN SAVED IN DRIVE |

| | ¥ | % | .0 | .00 | 123 ▼ | Arial | ▼ | 10 | ▼ | B | I | S | A | ▼ | OTHERS ▼ |

| | A | B | C | D | E | F | G |
|---|---|---|---|---|---|---|---|
| 1 | LABEL | FORMAT | SCAN COLOR | RESOLUTION | OCR | STORAGE LOCATION | |
| 2 | ESTIMATE | PDF | COLOR | 300 dpi | NO | | |
| 3 | ORDER | PDF | MONOCHROME | 300 dpi | YES | | |
| 4 | CONTRACT | PDF | COLOR | 200 dpi | NO | | |
| 5 | | | | | | | |
| 6 | | | | | | | |

INFORMATION PROCESSING SYSTEM, INFORMATION PROCESSING APPARATUS, AND INFORMATION PROCESSING METHOD FOR FACILITATING JOB PARAMETER SETTING

CROSS-REFERENCE TO RELATED APPLICATIONS

The present application claims priority under 35 U.S.C. § 119 to Japanese Patent Application No. 2015-191764 filed on Sep. 29, 2015, Japanese Patent Application No. 2015-191766 filed on Sep. 29, 2015, and Japanese Patent Application No. 2016-161471 filed on Aug. 19, 2016. The contents of which are incorporated herein by reference in their entirety.

BACKGROUND OF THE INVENTION

1. Field of the Invention

The present disclosure relates to an information processing system, an information processing apparatus, and an information processing method.

2. Description of the Related Art

Recent image forming apparatuses can provide services such as a cloud scanning service and a cloud printing service in collaboration with online services such as an online storage service provided via a network, e.g., the Internet.

Also, Japanese Laid-Open Patent Publication No. 2014-032659, for example, discloses an information processing system that allows an administrator to set a profile and enables an apparatus such as an image forming apparatus to collaborate with a service provided via a network according to the set profile.

SUMMARY OF THE INVENTION

According to one aspect of the present invention, an information processing system includes an information processing apparatus including a first processor configured to execute a first process, and an electronic apparatus connected via a network to the information processing apparatus and including a second processor configured to execute a second process. The first process includes identifying a location of a setting information file, which contains setting information used to execute a job at the electronic apparatus, based on hierarchical information indicating a hierarchical structure of files stored in a service providing system, obtaining the setting information from the setting information file in the identified location, and sending the obtained setting information to the electronic apparatus. The second process includes applying the setting information received from the information processing apparatus to a setting of the job to be executed at the electronic apparatus.

BRIEF DESCRIPTION OF THE DRAWINGS

FIG. 7 is a drawing illustrating an exemplary application-list setting sheet;

FIG. 8 is a drawing illustrating an exemplary application setting sheet;

FIG. 9 is a drawing illustrating the outline of an exemplary profile-list acquisition process;

FIG. 10 is a drawing illustrating the outline of an exemplary directory-information acquisition process;

FIG. 11 is a drawing illustrating the outline of an exemplary profile information extraction process;

FIG. 35 is a drawing illustrating an example of an original application-list spreadsheet; and FIG. 36 is a drawing illustrating an example of an original application-setting spreadsheet.

DESCRIPTION OF THE EMBODIMENTS

In an electronic apparatus, e.g., an image forming apparatus, that provides services such as a cloud scanning service and a cloud printing service, a user needs to set information (e.g., job settings and destination settings) that is necessary to execute jobs to provide the services. An aspect of this disclosure provides an information processing system, an information processing apparatus, and an information processing method that make it possible to easily set information necessary to execute jobs.

Embodiments of the present invention are described below with reference to the accompanying drawings.

<<First Embodiment>>
<System Configuration>

Figure 1:
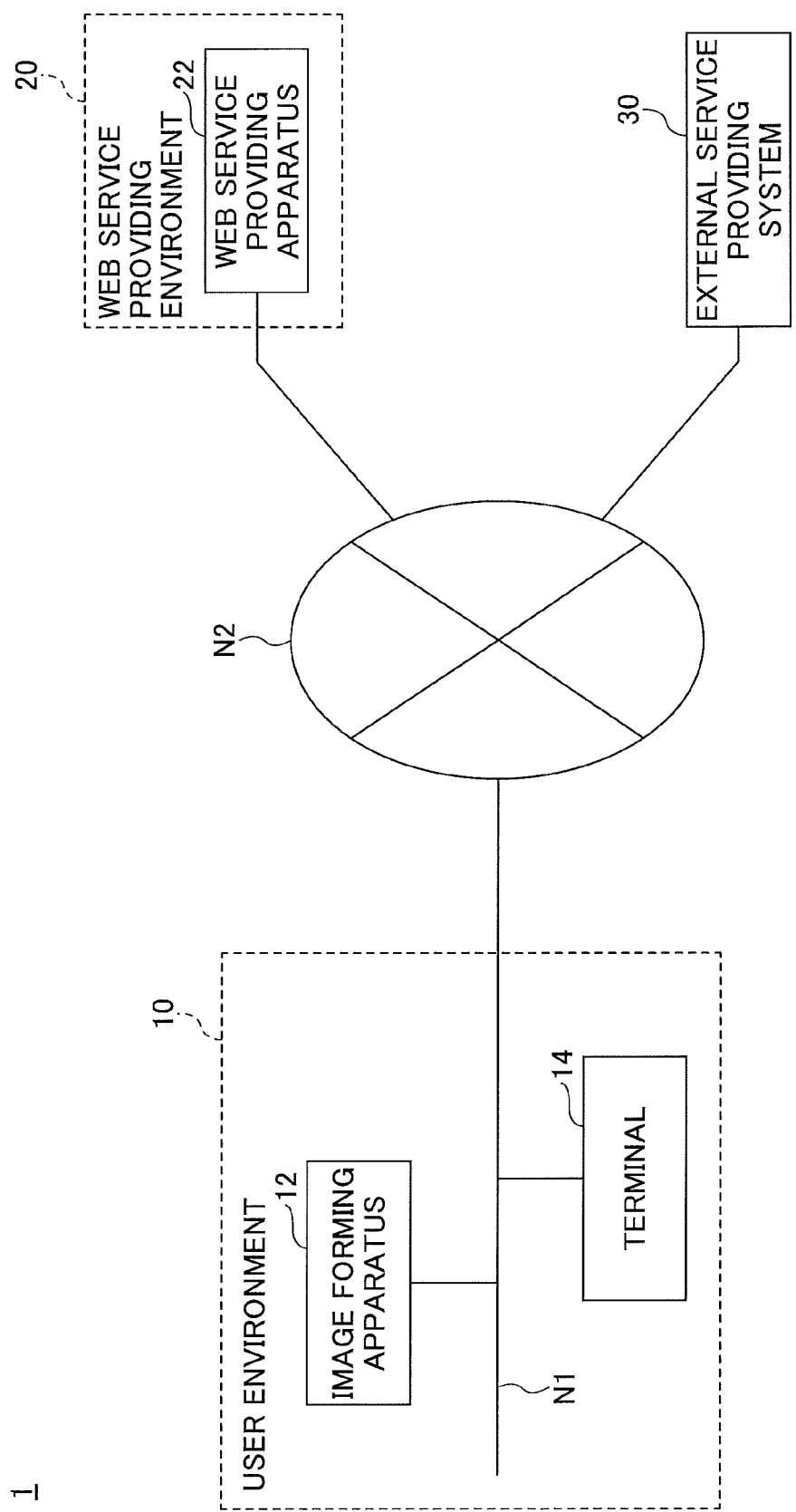
FIG. 1 is a drawing illustrating an exemplary configuration of an information processing system according to a first embodiment.

FIG. 1 is a drawing illustrating an exemplary configuration of an information processing system 1 according to a first embodiment. The information processing system 1 may include a user environment 10, a Web service providing environment 20, and an external service providing system 30 that are connected to each other via a network N2 such as the Internet.

The user environment 10 is, for example, a system of an organization such as a user company that uses an image forming apparatus 12. The user environment 10 may include at least one image forming apparatus 12 and a terminal 14 that are connected to each other via a network N1 such as a local area network (LAN).

The image forming apparatus 12 is an example of an electronic apparatus. Examples of electronic apparatuses according to the first embodiment may include image processing apparatuses such a multifunction peripheral, a scanner, a printer, a facsimile machine, a projector, and an electronic whiteboard; and other types of apparatuses that execute jobs according to job settings. For example, the image forming apparatus 12 performs image forming processes such as printing and facsimile transmission/reception.

The terminal 14 is used by an administrator and a user of the image forming apparatus 12 in the user environment 10. For example, the terminal 14 may be implemented by a personal computer (PC), a tablet computer, a smartphone, a cellphone, or a personal digital assistant (PDA).

The Web service providing environment 20 is a system of an organization, e.g., a service company that provides Web services such as a cloud scanning service and a cloud printing service via the network N2, and may include a Web service providing apparatus 22. Although the first embodiment is described using Web services as examples, the first embodiment may also be applied to any other type of services provided via the network N2 such as a service provided by an application service provider (ASP) and a cloud service.

The Web service providing apparatus 22 provides Web services such as a cloud scanning service and a cloud printing service via the network N2 to the image forming apparatus 12. For example, the cloud scanning service enables the image forming apparatus 12 of the user environment 10 to store scanned image data in a preset storage location (storage area) provided by an online storage service of the external service providing system 30. Also, the cloud printing service enables the image forming apparatus 12 of the user environment 10 to print data stored in a preset storage location provided by the online storage service of the external service providing system 30.

The external service providing system 30 provides services such as the online storage service via the network N2. In the first embodiment, services such as cloud services provided by the external service providing system 30 are referred to as "external services" to distinguish them from Web services provided by the Web service providing apparatus 22.

The network N1 of the information processing system 1 of FIG. 1 may be either a wired communication network or a wireless communication network. The configuration of the information processing system 1 illustrated by FIG. 1 is just an example, and the information processing system 1 may have a different configuration. For example, the Web service providing apparatus 22 of the Web service providing environment 20 may be implemented by multiple computers.

<Hardware Configurations>
[Computer]

Figure 2:
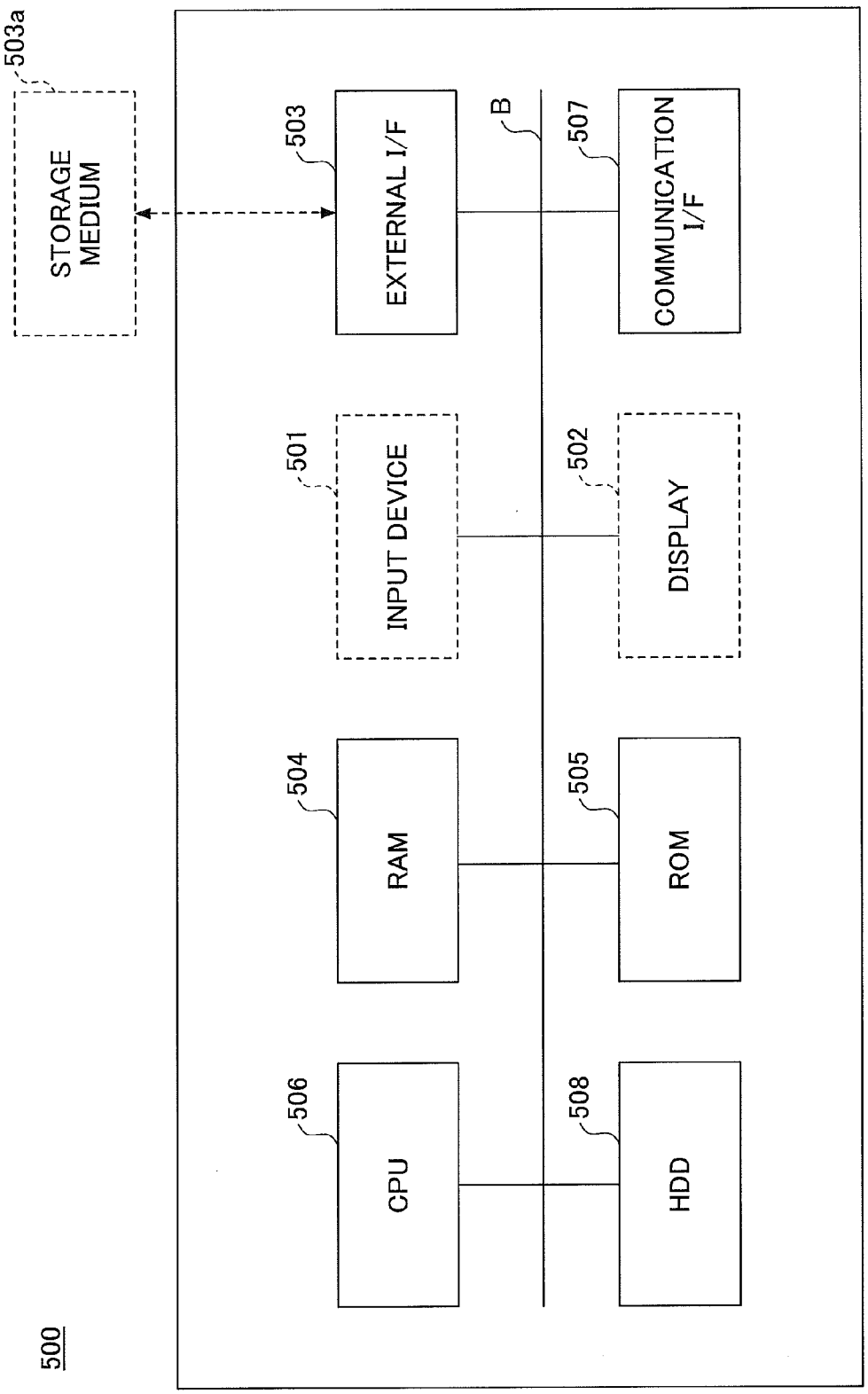
FIG. 2 is a block diagram illustrating an exemplary hardware configuration of a computer according to the first embodiment.

Each of the terminal 14, the Web service providing apparatus 22, and the external service providing system 30 may be implemented by, for example, a computer with a hardware configuration as illustrated by FIG. 2. FIG. 2 is a block diagram illustrating an exemplary hardware configuration of a computer 500 according to the first embodiment.

As illustrated by FIG. 2, the computer 500 may include an input device 501, a display 502, an external I/F 503, a random access memory (RAM) 504, a read-only memory (ROM) 505, a central processing unit (CPU) 506, a communication I/F 507, and a hard disk drive (HDD) 508 that are connected to each other via a bus B. The input device 501 and the display 502 may be configured to be connected to the computer 500 when necessary.

The input device 501 includes, for example, a keyboard, a mouse, and/or a touch panel, and is used by a user to input instructions (or operation signals). The display 502 displays, for example, processing results of the computer 500.

The communication I/F 507 is an interface for connecting the computer 500 to various networks. The computer 500 can perform data communications via the communication I/F 507.

The HDD 508 is an example of a non-volatile storage device for storing programs and data. For example, the HDD 508 may store basic software or an operating system (OS) for controlling the entire computer 500, and application software (or applications) that provide various functions on the OS. The HDD 508 may be replaced with another type of drive such as a solid-state drive (SSD) that uses a flash memory as a storage medium.

The external I/F 503 is an interface between the computer 500 and an external device such as a storage medium 503a. The computer 500 can read and write data from and to the storage medium 503a via the external I/F 503. Examples of the storage medium 503a include a flexible disk, a compact disk (CD), a digital versatile disk (DVD), a secure digital (SD) memory card, and a universal serial bus (USB) memory.

The ROM 505 is an example of a non-volatile semiconductor memory (storage device) that can retain programs and data even when power is turned off. For example, the ROM 505 stores programs and data such as a basic input/output system (BIOS) that is executed when the computer 500 is turned on, OS settings, and network settings. The RAM 504 is an example of a volatile semiconductor memory (storage device) for temporarily storing programs and data.

The CPU 506 is a processor that loads programs and data from storage devices such as the ROM 505 and the HDD 508 into the RAM 504, and executes the loaded programs to control the entire computer 500 and to implement various functions of the computer 500.

With the hardware configuration of the computer 500 of FIG. 2, the terminal 14, the Web service providing apparatus 22, and the external service providing system 30 can perform various processes described later.

[Image Forming Apparatus]

Figure 3:
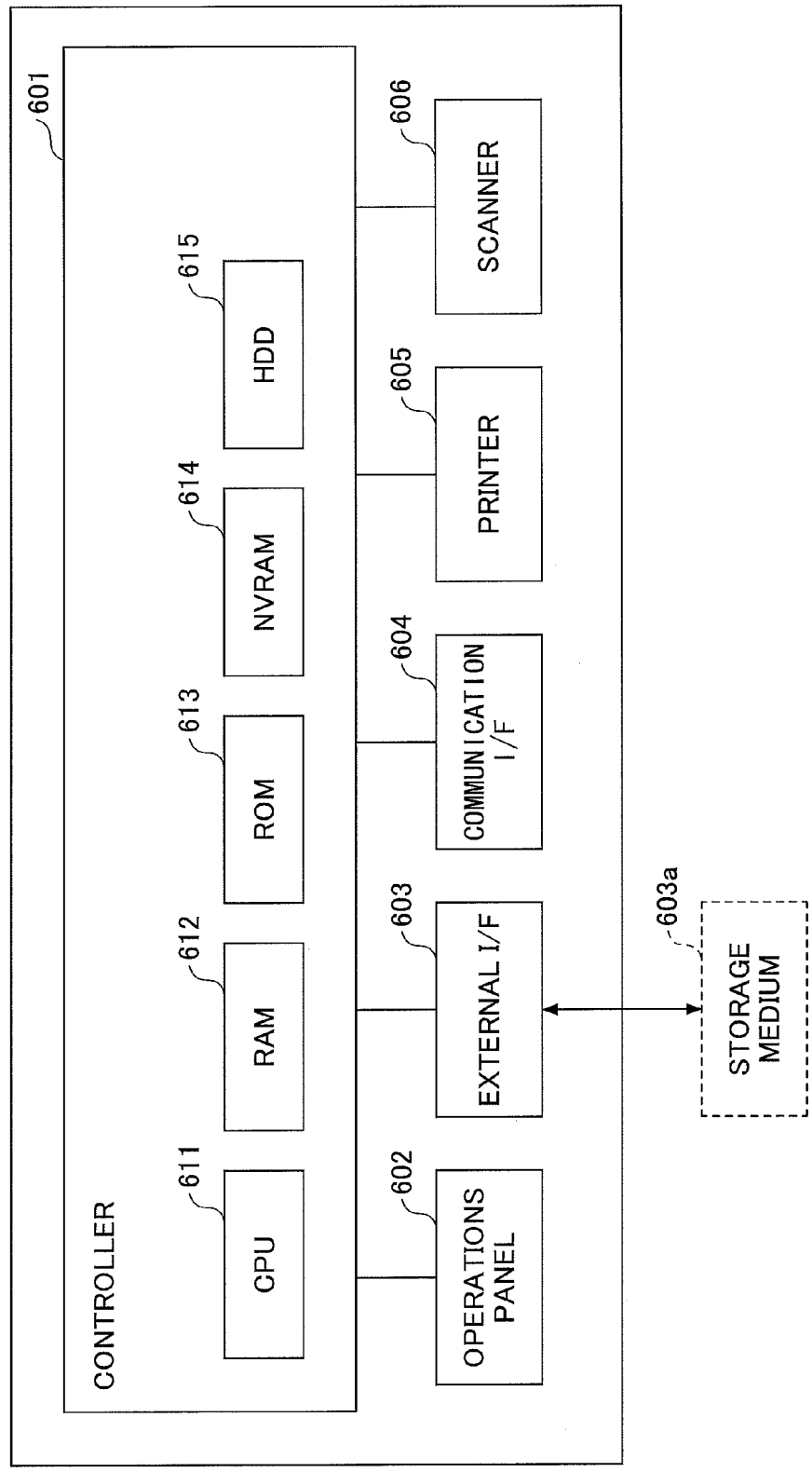
FIG. 3 is a block diagram illustrating an exemplary hardware configuration of an image forming apparatus according to the first embodiment.

The image forming apparatus 12 of FIG. 1 may have a hardware configuration as illustrated by FIG. 3. FIG. 3 is a block diagram illustrating an exemplary hardware configuration of the image forming apparatus 12 of the first embodiment. As illustrated by FIG. 3, the image forming apparatus 12 may include a controller 601, an operations panel 602, an external I/F 603, a communication I/F 604, a printer 605, and a scanner 606.

The controller 601 may include a CPU 611, a RAM 612, a ROM 613, a non-volatile RAM (NVRAM) 614, and an HDD 615. The ROM 613 stores various programs and data. The RAM 612 temporarily stores programs and data. The NVRAM 614 stores, for example, setting information. The HDD 615 stores various programs and data.

The CPU 611 loads programs, data, and setting information from the ROM 613, the NVRAM 614, and the HDD 615 into the RAM 612, and executes the loaded programs to control the entire image forming apparatus 12 and implement various functions of the image forming apparatus 12.

The operations panel 602 includes an input unit for receiving user inputs and a display unit for displaying information. The external I/F 603 is an interface between the image forming apparatus 12 and an external device such as a storage medium 603a. The image forming apparatus 12 can read and write data from and to the storage medium 603a via the external I/F 603. Examples of the storage medium 603a include an IC card, a flexible disk, a CD, a DVD, an SD memory card, and a USB memory.

The communication I/F 604 is an interface for connecting the image forming apparatus 12 to the network N1. The image forming apparatus 12 can perform data communications with other apparatuses via the communication I/F 604. The printer 605 prints data on a recording medium. Examples of recording media include paper, coated paper, cardboard, an overhead projector (OHP) sheet, a plastic film, prepreg, and copper foil. The scanner 606 scans a document to obtain image data (electronic data).

<Functional Configurations>

Figure 4:
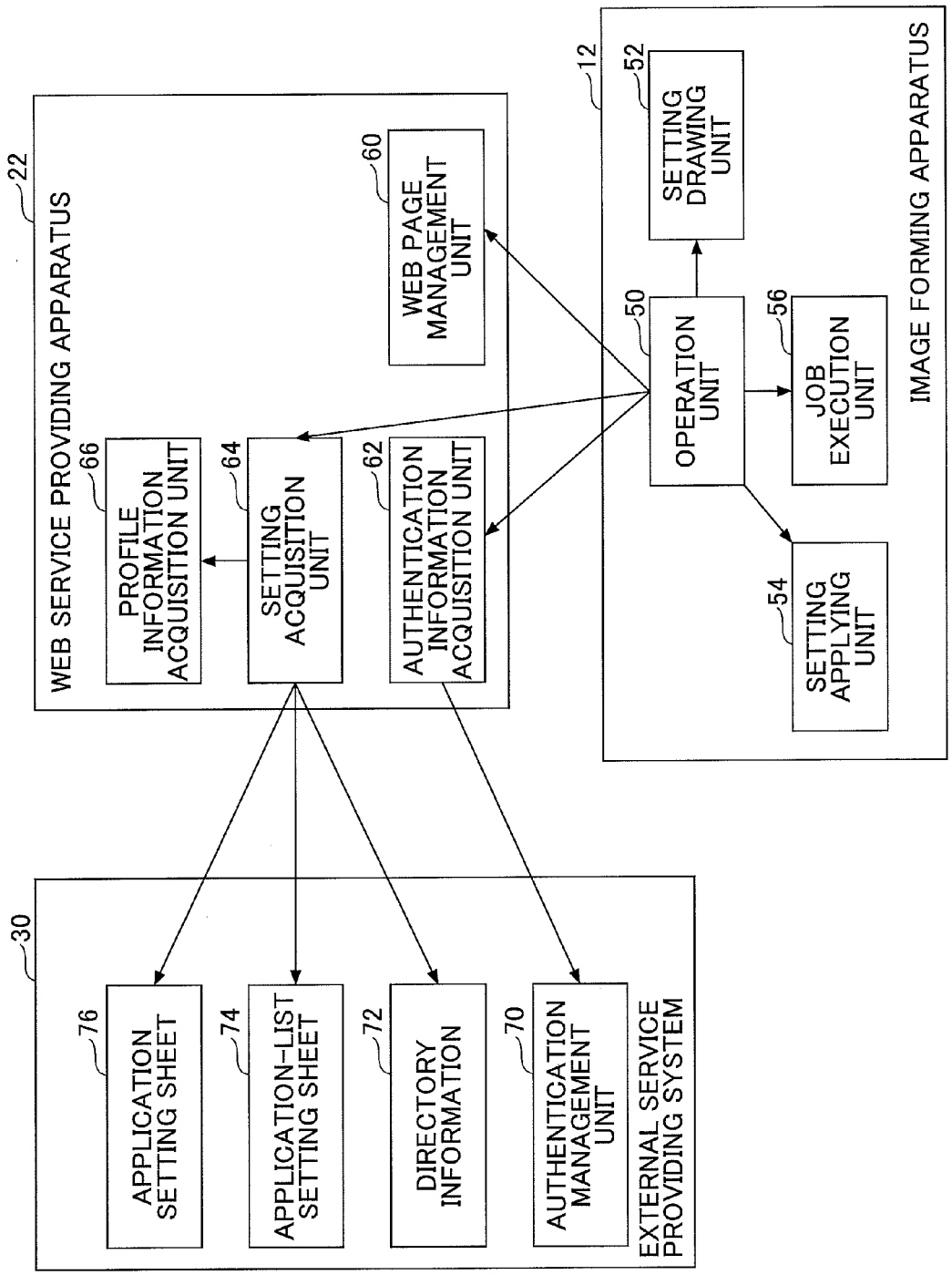
FIG. 4 is a block diagram illustrating an exemplary functional configuration of the information processing system according to the first embodiment.

The image forming apparatus 12, the Web service providing apparatus 22, and the external service providing system 30 of the first embodiment may have functional configurations as illustrated by FIG. 4. FIG. 4 is a block diagram illustrating an exemplary functional configuration of the information processing system 1 according to the first embodiment.

The image forming apparatus 12 of the information processing system 1 executes a program(s) to implement an operation unit 50, a setting drawing unit 52, a setting applying unit 54, and a job execution unit 56.

The Web service providing apparatus 22 of the information processing system 1 executes a program(s) to implement a Web page management unit 60, an authentication information acquisition unit 62, a setting acquisition unit 64, and a profile information extraction unit 66.

The external service providing system 30 of the information processing system 1 executes a program(s) to implement an authentication management unit 70. The external service providing system 30 also includes directory information 72, an application-list setting sheet 74, and an application setting sheet 76.

The operation unit 50 of the image forming apparatus 12 receives instructions from a user. The operation unit 50 also obtains screen data from the Web service providing apparatus 22 and displays screens based on the screen data. The setting drawing unit 52 draws various screens for allowing a user to select settings. The setting applying unit 54 applies job settings to job execution parameters. The job execution unit 56 executes a job based on the job execution parameters to which the job settings are applied.

The Web page management unit 60 of the Web service providing apparatus 22 provides screen data to the image forming apparatus 22. The authentication information acquisition unit 62 obtains authentication information from the external service providing system 30. The setting acquisition unit 64 obtains the directory information 72, the application-list setting sheet 74, and the application setting sheet 76 from the external service providing system 30. The profile information extraction unit 66 extracts profile information from the directory information 72.

The authentication management unit 70 of the external service providing system 30 manages an authentication process based on user information, and when the authentication process is successful, returns authentication information. The external service providing system 30 also provides the directory information 72, the application-list setting sheet 74, and the application setting sheet 76 to the Web service providing apparatus 22.

<Processes>

Exemplary processes performed in the information processing system 1 of the first embodiment are described below.

[User Operations]

Figure 5:
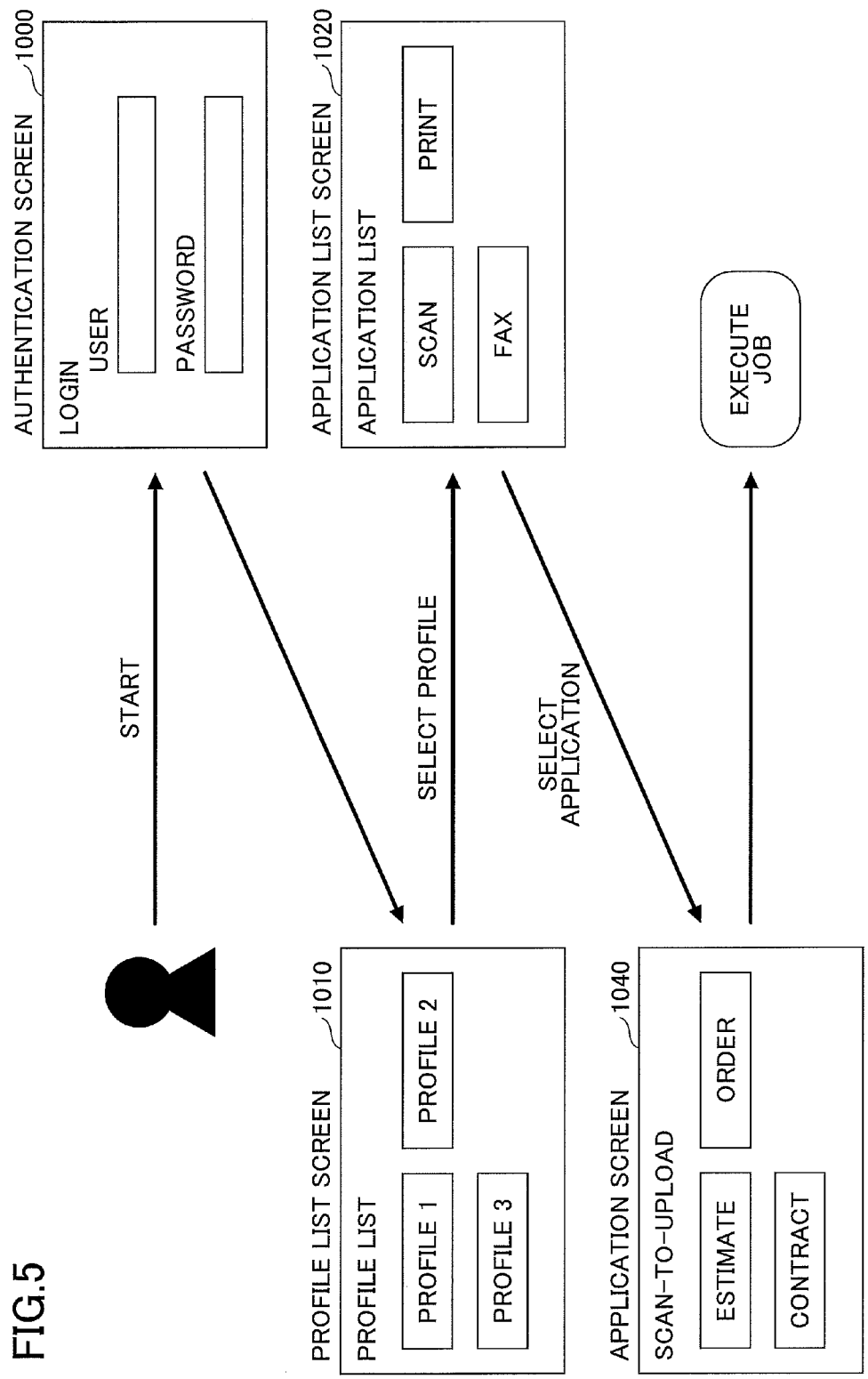
FIG. 5 is a drawing illustrating exemplary user operations in the information processing system according to the first embodiment.

For example, a user performs operations in a sequence as illustrated by FIG. 5 to execute a job. FIG. 5 is a drawing illustrating exemplary user operations in the information processing system 1 according to the first embodiment. The user starts an application of the image forming apparatus 12, and the application displays an authentication screen 1000. When the directory information 72, the application-list setting sheet 74, and the application setting sheet 76 to be used by the started application are accessible without authentication, the authentication screen 1000 is not displayed.

The user enters a user name and a password, which are examples of user information, on the authentication screen 1000 to request a login. The user name and the password used at this step may be unique to the user operating the image forming apparatus 12 or common to multiple users who use the image forming apparatus 12. Also, user information entered on the authentication screen 1000 may include other information such as an email address in addition to or instead of the user name and the password.

When the authentication is successful, the image forming apparatus 12 obtains profile list information from the Web service providing apparatus 22 by using authentication information, and displays a profile list screen 1010. Here, a profile indicates a group of application settings. In the example of FIG. 5, the profile list screen 1010 displays a profile list including profile names "profile 1", "profile 2", and "profile 3".

The profile list displayed on the profile list screen 1010 is defined by the user using a directory structure of an external storage provided by the external service providing system 30. The profile list information includes profile names and application-list spreadsheet information corresponding to each of the profile names.

The user selects one of the profile names displayed on the profile list screen 1010. The image forming apparatus 12 obtains the application-list setting sheet 74 based on application-list spreadsheet information corresponding to the profile name selected by the user. Then, the image forming apparatus 12 displays an application list screen 1020 including an application list. The application list displayed on the application list screen 1020 is defined by the user by using the application-list setting sheet 74.

The user selects one of application names displayed on the application list screen 1020. The image forming apparatus 12 obtains the application setting sheet 76 corresponding to the application name selected by the user, and displays an application screen 1040. In the example of FIG. 5, the application screen 1040 displays job setting names including "estimate", "order", and "contract". The job setting names are defined by the user by using the application setting sheet 76.

The user selects one of the job setting names displayed on the application screen 1040. The image forming apparatus 12 reads job setting information corresponding to the selected job setting name from the application setting sheet 76, and executes a job based on the job setting information. Thus, the user can select job setting information via the application screen 1040 and cause the image forming apparatus 12 to execute a job based on the selected job setting information.

The process illustrated by FIG. 5 is not necessarily performed from the beginning every time. For example, by storing authentication information and a selected profile name in the image forming apparatus 12, the steps of displaying the authentication screen 1000 and the profile list screen 1010 can be omitted. In this case, when an application is started by the user, the image forming apparatus 12 skips the display of the authentication screen 1000 and the profile list screen 1010, and displays the application list screen 1020 first.

[Directory Structure]

Figure 6:
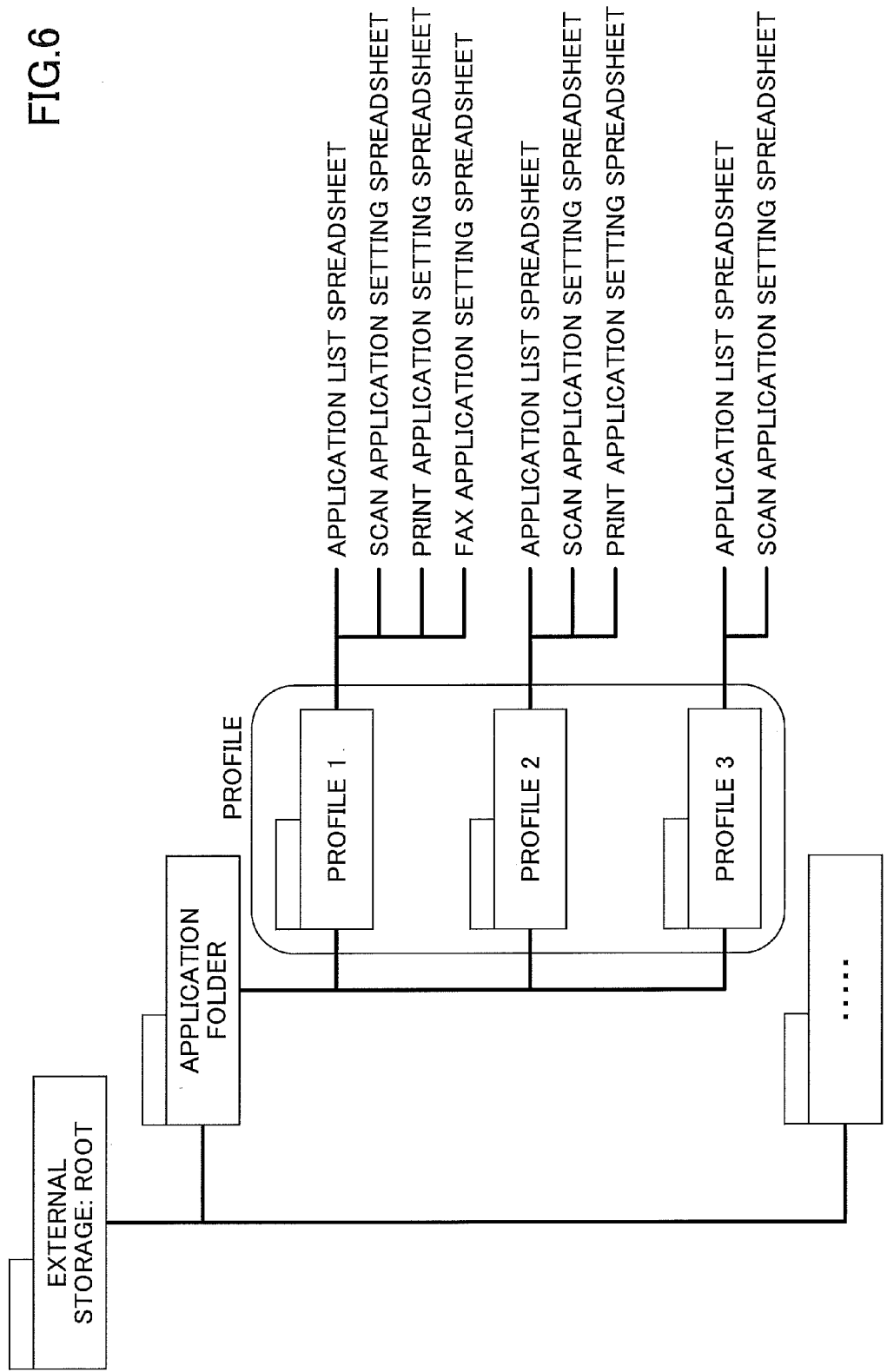
FIG. 6 is a drawing illustrating an exemplary directory structure of an external storage provided by an external service providing system.

An external storage provided by the external service providing system 30 may have a directory structure as illustrated by FIG. 6. FIG. 6 is a drawing illustrating an exemplary directory structure of the external storage provided by the external service providing system 30.

In the directory structure of FIG. 6, a specific folder with a specific name "application folder" is provided directly under the root of the external storage provided by the external service providing system 30. When a specific spreadsheet with a specific name "application list spreadsheet" exists in a nonspecific folder that has any name and is in the application folder, the nonspecific folder is identified as a profile folder, and the name of the nonspecific folder is used as a profile name.

In the example of FIG. 6, a profile 1 folder, a profile 2 folder, and a profile 3 folder, each of which contains an application list spreadsheet, are used as profile folders. Also, the names "profile 1", "profile 2", and "profile 3" of the profile folders are used as profile names displayed on the profile list screen 1010.

With the directory structure of FIG. 6, the information processing system 1 of the first embodiment can control the access to folders and spreadsheets, and can easily limit the use of profiles and application settings.

[Application-List Setting Sheet]

FIG. 7 is a drawing illustrating an application list spreadsheet that is an example of the application-list setting sheet 74. In the application list spreadsheet, each row corresponds to the application settings of one application. In the example of FIG. 7, values in the column "label" represent application names displayed as an application list on the application list screen 1020. Also, values in the column "application URL" represent uniform resource locators (URLs) indicating the locations of application setting sheets 76 corresponding to the application names.

[Application Setting Sheet]

FIG. 8 is a drawing illustrating an application setting spreadsheet (scan application setting spreadsheet) that is an example of the application setting sheet 76. In the application setting spreadsheet, each row corresponds to the job settings of one job. In the example of FIG. 8, values in the column "label" represent job setting names displayed on the application screen 1040.

The exemplary application setting spreadsheet of FIG. 8 contains job setting information for a scan-to-upload service (or a cloud scanning service) for storing scanned image data in a preset storage location. The job setting information contained in the application setting spreadsheet of FIG. 8 includes "label", "format", "scan color", "resolution", "OCR", and "storage location" as information items.

The "format", "scan color", and "resolution" are parameters used by the image forming apparatus 12 to scan a document. The "OCR" indicates whether to perform optical character recognition (OCR) on image data obtained by scanning the document. The "storage location" indicates a location where the obtained image data is to be stored.

[Outline of Profile-List Acquisition Process]

For example, the image forming apparatus 12 displays the profile list screen 1010 through a process as illustrated by FIG. 9. FIG. 9 is a drawing illustrating the outline of an exemplary profile-list acquisition process. First, the user operates the image forming apparatus 12 to start an application.

At step S11, the image forming apparatus 12 sends a profile-list screen request to the Web service providing apparatus 22. At step S12, the image forming apparatus 12 receives screen data of a profile list screen 1010a from the Web service providing apparatus 22. The image forming apparatus 12 displays the profile list screen 1010a based on the received screen data.

At step S13, the image forming apparatus 12 sends a profile-list information request including the authentication information to the Web service providing apparatus 22. At step S14, the Web service providing apparatus 22 sends a directory information request including the authentication information to the external service providing system 30. At step S15, the external service providing system 30 sends directory information to the Web service providing apparatus 22.

A directory information acquisition process (steps S14 and S15) is performed as illustrated by FIG. 10. FIG. 10 is a drawing illustrating the outline of the directory-information acquisition process.

At step S14, the Web service providing apparatus 22 requests directory information for one or more hierarchical levels necessary to identify a profile. In the case of the directory structure of FIG. 6, for example, the Web service providing apparatus 22 requests directory information for three hierarchical levels. At step S15, the Web service providing apparatus 22 receives directory information for the hierarchical levels necessary to identify a profile from the external service providing system 30.

Depending on the external service providing system 30, there may be a case where directory information for multiple hierarchical levels cannot be obtained at a time. In such a case, the Web service providing apparatus 22 may obtain directory information for one hierarchical level at a time from the external service providing system 30.

The Web service providing apparatus 22 extracts profile information from the directory information as exemplified by FIG. 11. FIG. 11 is a drawing illustrating the outline of an exemplary profile information extraction process.

The Web service providing apparatus 22 obtains directory information as exemplified by FIG. 11 (A) from the external service providing system 30. According to the definition of the directory structure described above with reference to FIG. 6, the Web service providing apparatus 22 extracts profile information as illustrated by FIG. 11 (B) from the directory information of FIG. 11 (A).

Parts of the directory information of FIG. 11 (A) and parts of the profile information of FIG. 11 (B) are omitted for brevity. As illustrated by FIG. 11, the Web service providing apparatus 22 can extract profile information from directory information representing the directory structure of the external storage provided by the external service providing system 30.

Referring back to FIG. 9, at step S16, the Web service providing apparatus 22 sends profile list information to the image forming apparatus 12 based on the extracted profile information. The profile list information includes profile names and application-list spreadsheet information corresponding to each of the profile names. The image forming apparatus 12 displays the profile list screen 1010 based on the profile list information.

[Outline of Application-List Acquisition Process]

Figure 12:
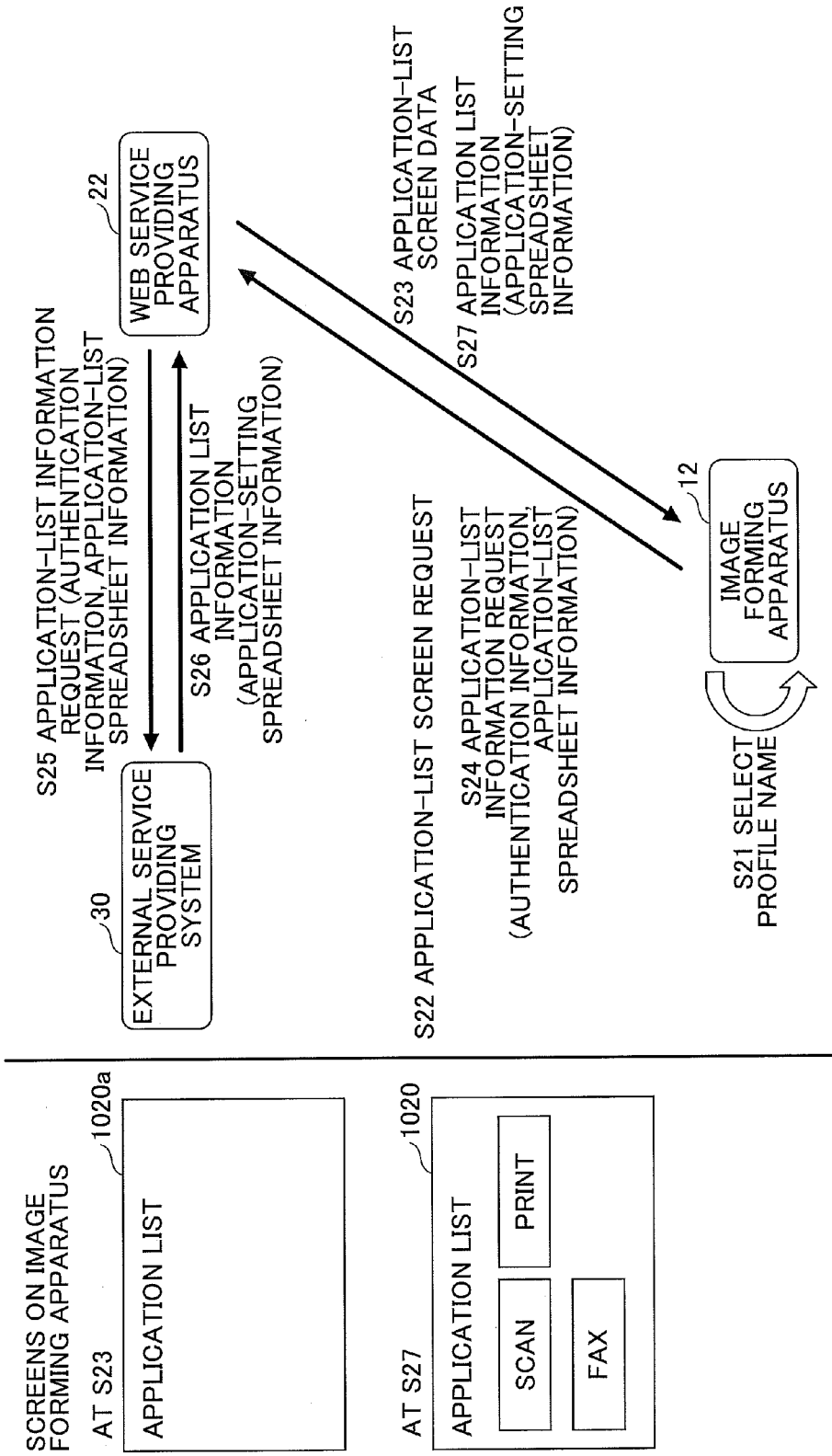
FIG. 12 is a drawing illustrating the outline of an exemplary application-list acquisition process.

For example, the image forming apparatus 12 displays the application list screen 1020 through a process as illustrated by FIG. 12. FIG. 12 is a drawing illustrating the outline of an exemplary application-list acquisition process.

At step S21, the user operates the image forming apparatus 12 to select a profile name on the profile list screen 1010. At step S22, the image forming apparatus 12 sends an application-list screen request to the Web service providing apparatus 22. At step S23, the image forming apparatus 12 receives screen data of an application list screen 1020a from the Web service providing apparatus 22. The image forming apparatus 12 displays the application list screen 1020a based on the received screen data.

At step S24, the image forming apparatus 12 sends an application-list information request, which includes the authentication information and application-list spreadsheet information corresponding to the selected profile name, to the Web service providing apparatus 22. At step S25, the Web service providing apparatus 22 sends an application-list information request including the authentication information and the application-list spreadsheet information to the external service providing system 30.

At step S26, the external service providing system 30 sends application list information to the Web service providing apparatus 22. The application list information includes application-setting spreadsheet information. At step S27, the Web service providing apparatus 22 sends the application list information to the image forming apparatus 12. The image forming apparatus 12 displays the application list screen 1020 based on the application list information.

[Outline of Application-Screen Acquisition Process]

Figure 13:
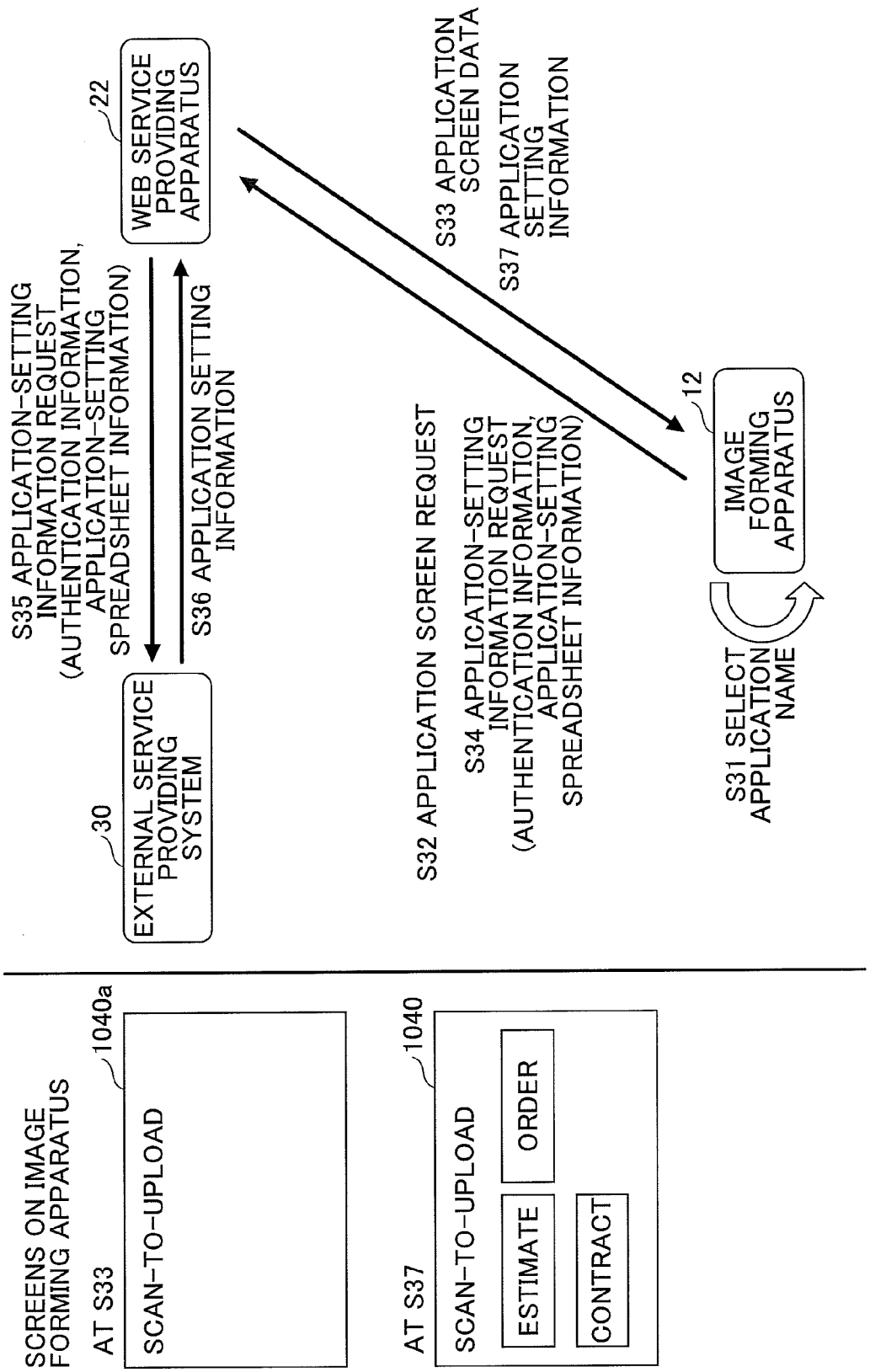
FIG. 13 is a drawing illustrating the outline of an exemplary application-screen acquisition process.

For example, the image forming apparatus 12 displays the application screen 1040 through a process as illustrated by FIG. 13. FIG. 13 is a drawing illustrating the outline of an exemplary application-screen acquisition process.

At step S31, the user operates the image forming apparatus 12 to select an application name on the application list screen 1020. At step S32, the image forming apparatus 12 sends an application screen request to the Web service providing apparatus 22. At step S33, the image forming apparatus 12 receives screen data of an application screen 1040a from the Web service providing apparatus 22. The image forming apparatus 12 displays the application screen 1040a based on the received screen data.

At step S34, the image forming apparatus 12 sends an application-setting information request, which includes the authentication information and application-setting spreadsheet information corresponding to the selected application name, to the Web service providing apparatus 22. At step S35, the Web service providing apparatus 22 sends an application-setting information request including the authentication information and the application-setting spreadsheet information to the external service providing system 30.

At step S36, the external service providing system 30 sends application setting information to the Web service providing apparatus 22. The application setting information includes an application setting spreadsheet. At step S37, the Web service providing apparatus 22 sends the application setting information to the image forming apparatus 12. The image forming apparatus 12 displays the application screen 1040 based on the application setting information.

[Authentication-Information Acquisition Process]

Figure 14:
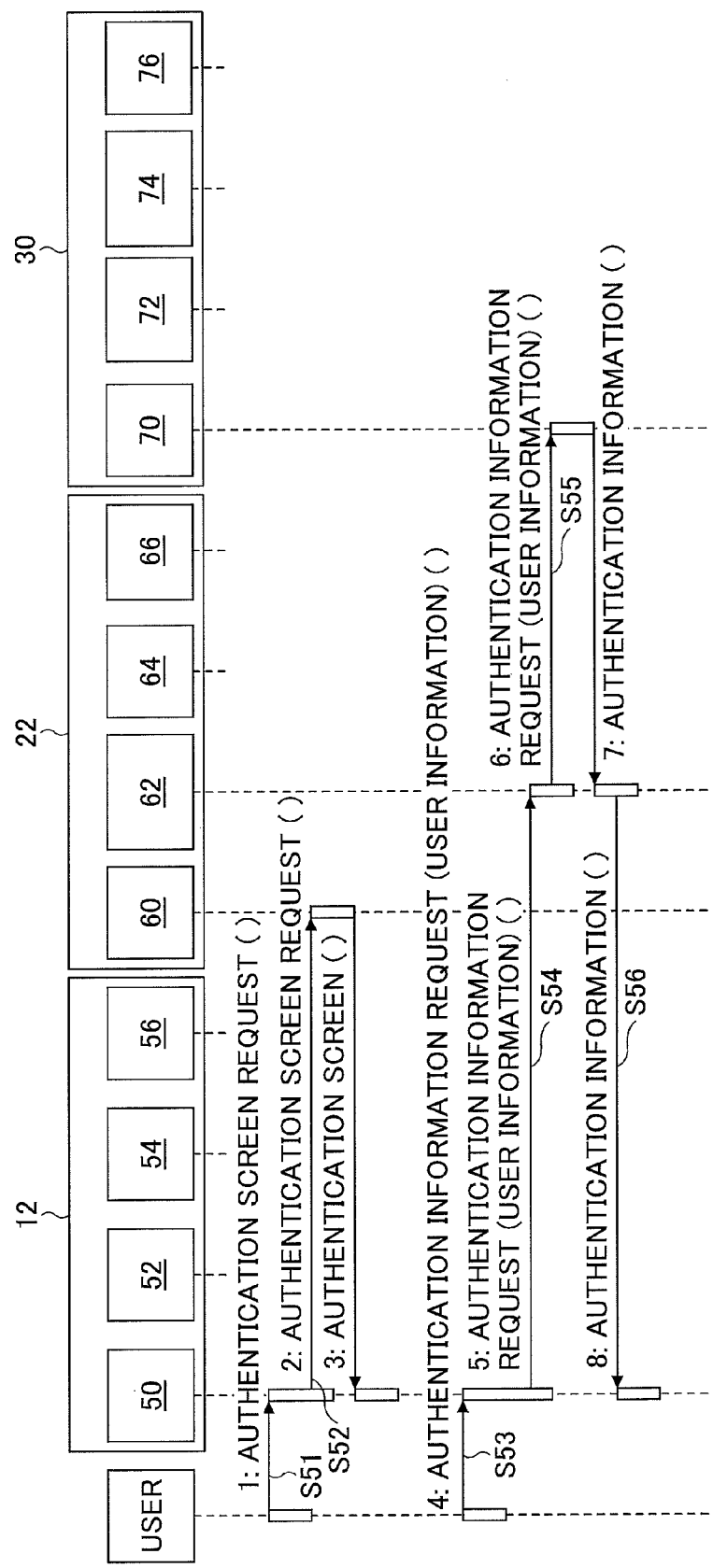
FIG. 14 is a sequence chart illustrating an example of an authentication-information acquisition process.

For example, the image forming apparatus 12 obtains authentication information of the external service providing system 30 through a process as illustrated by FIG. 14. FIG. 14 is a sequence chart illustrating an example of an authentication-information acquisition process.

At step S51, the user operates the operation unit 50 of the image forming apparatus 12 to enter an authentication screen request to display the authentication screen 1000. At step S52, the operation unit 50 sends an authentication screen request to the Web page management unit 60 of the Web service providing apparatus 22, and obtains screen data of the authentication screen 1000. Then, the operation unit 50 displays the authentication screen 1000.

At step S53, the user enters user information including a user name and a password on the authentication screen 1000 to request a login. At step S54, the operation unit 50 sends an authentication information request including the entered user information to the authentication information acquisition unit 62 of the Web service providing apparatus 22.

At step S55, the authentication information acquisition unit 62 of the Web service providing apparatus 22 sends an authentication information request including the user information to the authentication management unit 70 of the external service providing system 30. When authentication based on the user information is successful, the authentication management unit 70 sends authentication information to the authentication information acquisition unit 62 of the Web service providing apparatus 22. At step S56, the authentication information acquisition unit 62 sends the authentication information to the operation unit 50 of the image forming apparatus 12.

Through the authentication-information acquisition process of FIG. 14, the image forming apparatus 12 can obtain authentication information of the external service providing system 30.

[Profile-List Acquisition Process]

Figure 15:
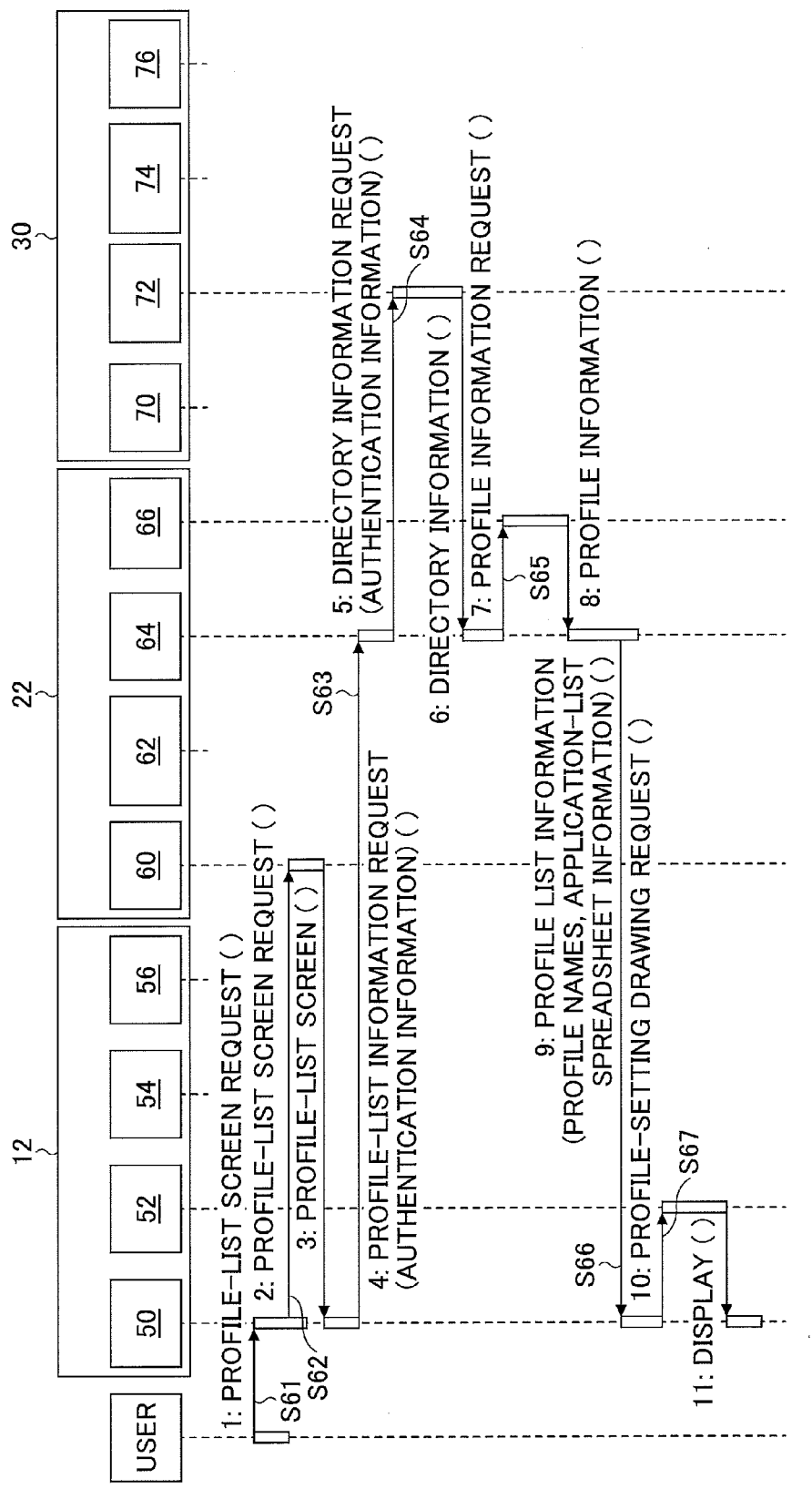
FIG. 15 is a sequence chart illustrating an example of a profile-list acquisition process.

The image forming apparatus 12 displays the profile-list screen 1010 through a process as illustrated by FIG. 15. FIG. 15 is a sequence chart illustrating an example of a profile-list acquisition process.

At step S61, the user operates the operation unit 50 of the image forming apparatus 12 to enter a profile-list screen request to display the profile list screen 1010. At step S62, the operation unit 50 sends a profile-list screen request to the Web page management unit 60 of the Web service providing apparatus 22, and obtains screen data of the profile list screen 1010a. Then, the operation unit 50 displays the profile list screen 1010a.

At step S63, the operation unit 50 of the image forming apparatus 50 sends a profile-list information request including the authentication information to the setting acquisition unit 64 of the Web service providing apparatus 22. At step S64, the setting acquisition unit 64 of the Web service providing apparatus 22 sends a directory information request (a request for the directory information 72) including the authentication information to the external service providing system 30. The external service providing system 30 sends directory information (e.g., directory information of FIG. 11 (A)) to the setting acquisition unit 64 of the Web service providing apparatus 22.

At step S65, the setting acquisition unit 64 sends a profile information request to the profile information extraction unit 66. The profile information extraction unit 66 extracts profile information as exemplified by FIG. 11 (B) from directory information as exemplified by FIG. 11 (A). The profile information extraction unit 66 sends the extracted profile information to the setting acquisition unit 64.

At step S66, the setting acquisition unit 64 of the Web service providing apparatus 22 sends profile list information to the operation unit 50 of the image forming apparatus 12 based on the profile information obtained from the profile information extraction unit 66. The profile list information includes profile names and application-list spreadsheet information corresponding to each of the profile names. At step S67, the operation unit 50 of the image forming apparatus 50 sends a profile-setting drawing request to cause the setting drawing unit 52 to display the profile list screen 1010 based on the profile list information.

[Application-List Acquisition Process]

Figure 16:
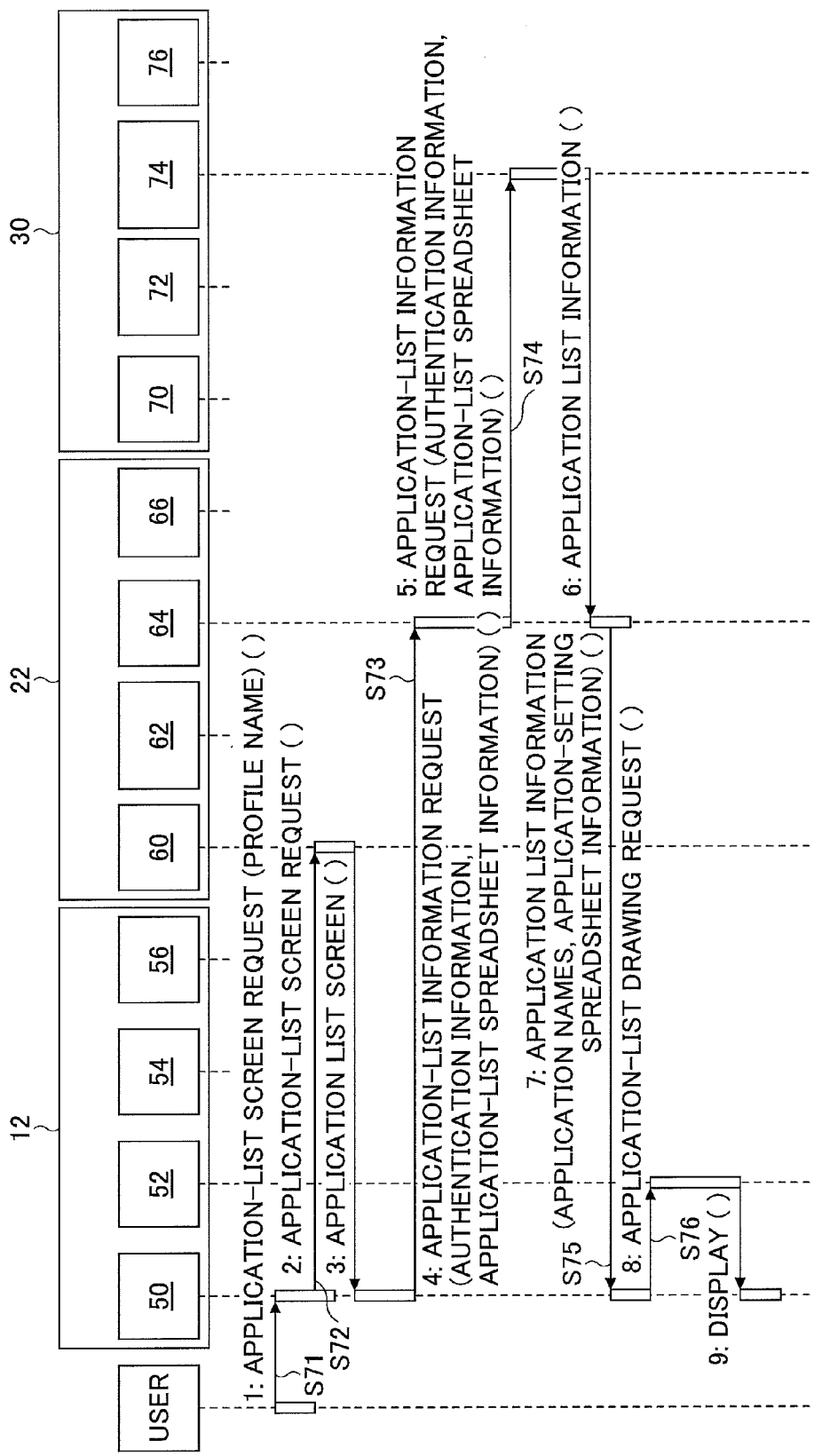
FIG. 16 is a sequence chart illustrating an example of an application-list acquisition process.

For example, the image forming apparatus 12 displays the application list screen 1020 through a process as illustrated by FIG. 16. FIG. 16 is a sequence chart illustrating an example of an application-list acquisition process.

At step S71, the user operates the operation unit 50 of the image forming apparatus 12 to select a profile name on the profile list screen 1010 and thereby enter an application-list screen request. At step S72, the operation unit 50 sends an application-list screen request to the Web page management unit 60 of the Web service providing apparatus 22, and obtains screen data of the application list screen 1020a. Then, the operation unit 50 displays the application list screen 1020a.

At step S73, the operation unit 50 sends an application-list information request, which includes the authentication information and application-list spreadsheet information corresponding to the selected profile name, to the setting acquisition unit 64 of the Web service providing apparatus 22. At step S74, the setting acquisition unit 64 of the Web service providing apparatus 22 sends a request for the application-list setting sheet 74 together with the authentication information and the application-list spreadsheet information, to the external service providing system 30. The external service providing system 30 sends the application-list setting sheet 74 to the setting acquisition unit 64 of the Web service providing apparatus 22.

At step S75, the setting acquisition unit 64 of the Web service providing apparatus 22 sends the application-list setting sheet 74 to the operation unit 50 of the image forming apparatus 12. At step S76, the operation unit 50 of the image forming apparatus 50 sends an application-list drawing request to cause the setting drawing unit 52 to display the application list screen 1020 based on the application-list setting sheet 74.

[Application-Screen Acquisition Process]

Figure 17:
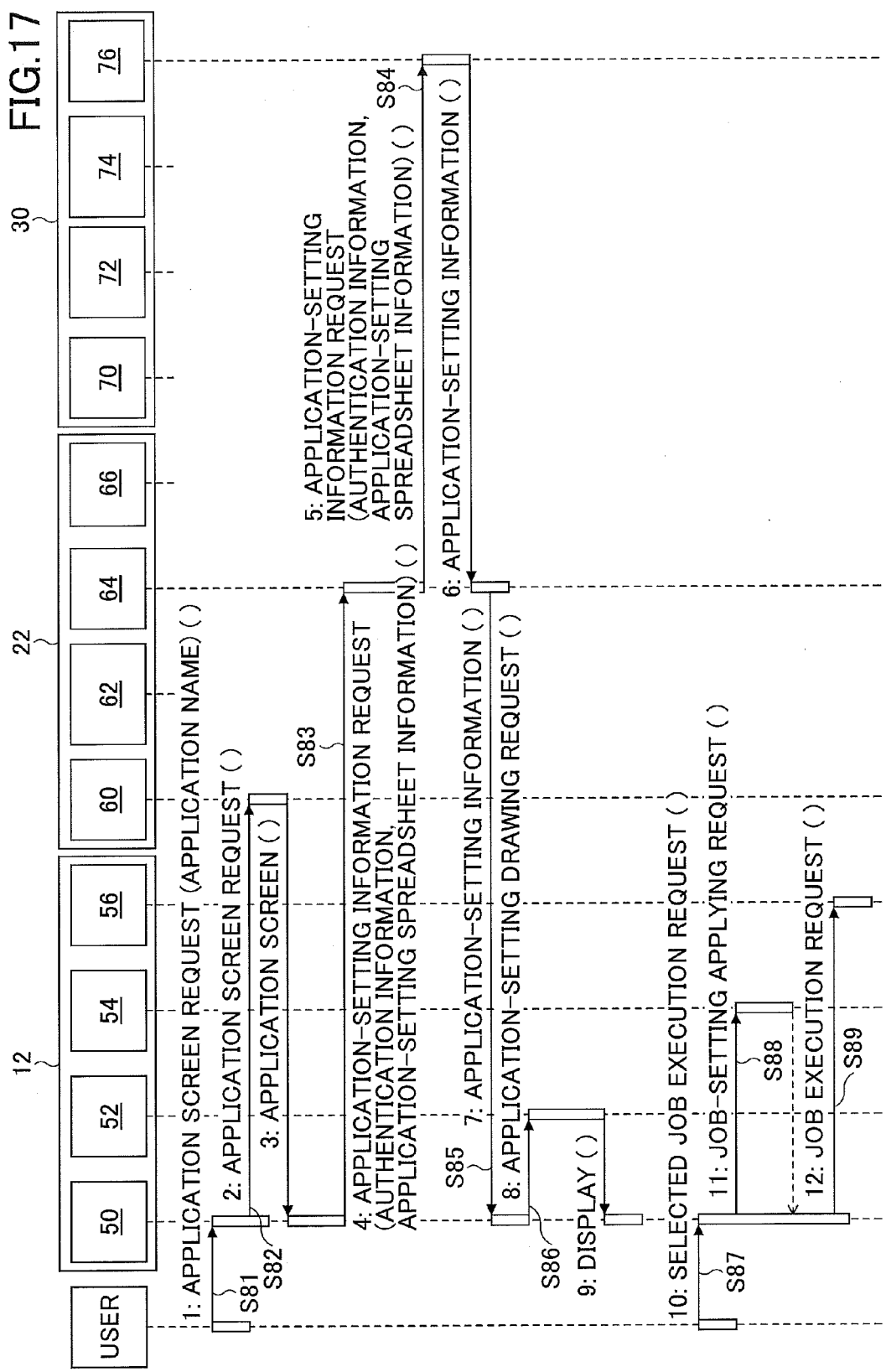
FIG. 17 is a sequence chart illustrating an example of an application-screen acquisition process.

For example, the image forming apparatus 12 displays the application screen 1040 through a process as illustrated by FIG. 17. FIG. 17 is a sequence chart illustrating an example of an application-screen acquisition process.

At step S81, the user operates the operation unit 50 of the image forming apparatus 12 to select an application name on the application list screen 1020 and thereby enter an application screen request. At step S82, the operation unit 50 sends an application screen request to the Web page management unit 60 of the Web service providing apparatus 22, and obtains screen data of the application screen 1040a. Then, the operation unit 50 displays the application screen 1040a.

At step S83, the operation unit 50 sends an application-setting information request, which includes the authentication information and application-setting spreadsheet information corresponding to the selected application name, to the setting acquisition unit 64 of the Web service providing apparatus 22. At step S84, the setting acquisition unit 64 of the Web service providing apparatus 22 sends a request for application setting information (the application setting sheet 76) together with the authentication information and the application-setting spreadsheet information, to the external service providing system 30. The external service providing system 30 sends the application setting information to the setting acquisition unit 64 of the Web service providing apparatus 22.

At step S85, the setting acquisition unit 64 of the Web service providing apparatus 22 sends the application setting information to the operation unit 50 of the image forming apparatus 12. At step S86, the operation unit 50 of the image forming apparatus 12 displays the application screen 1040 based on the application setting information.

At step S87, the user operates the operation unit 50 of the image forming apparatus 12 to select a job setting name on the application screen 1040 and thereby enter a selected job execution request. At step S88, the operation unit 50 reads job setting information corresponding to the selected job setting name from the application setting sheet 76. Then, the operation unit 50 sends a job-setting applying request to cause the setting applying unit 54 to apply the read job setting information to job execution parameters. At step S89, the operation unit 50 sends a job execution request to cause the job execution unit 56 to execute a job based on the job execution parameters to which the job setting information is applied.

<Summary>

The first embodiment makes it possible to obtain application list information and application setting information from the external service providing system 30 by using profile information identified based on the directory structure of the external storage of the external service providing system 30.

Accordingly, with the use of a directory structure as illustrated by FIG. 6, the first embodiment eliminates the need to use different user interfaces for different applications of the image forming apparatus 12 to set locations of application list information and application setting information. Also, the first embodiment makes it possible to provide multiple profile folders under each application folder of the external storage of the external service providing system 30, and makes it possible to provide multiple application settings for each profile.

Further, the information processing system 1 of the first embodiment enables the user to easily set profile information, application list information, and application setting information by using a familiar user interface of the external service providing system 30.

<<Second Embodiment>>

In the first embodiment, the information processing system 1 includes one external service providing system 30. In a second embodiment, an information processing system 1A includes multiple external service providing systems 30. In the second embodiment, descriptions of configurations and methods that are substantially the same as those of the first embodiment may be omitted.

<System Configuration>

Figure 18:
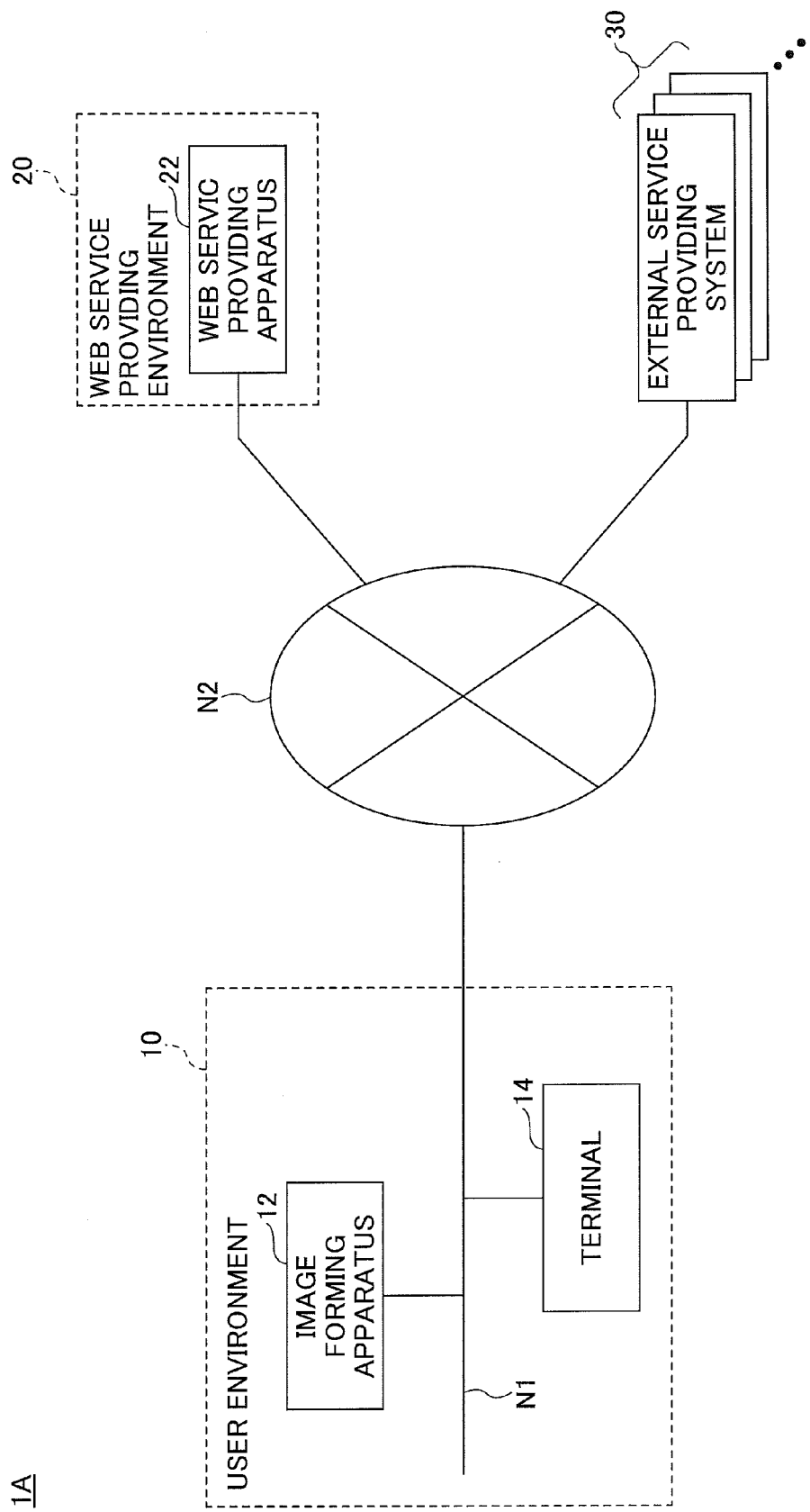
FIG. 18 is a drawing illustrating an exemplary configuration of an information processing system according to a second embodiment.

FIG. 18 is a drawing illustrating an exemplary configuration of the information processing system 1A according to the second embodiment. The information processing system 1A of FIG. 18 is different from the information processing system 1 of FIG. 1 in that multiple external service providing systems 30 are connected to the network N2. In the information processing system 1A of FIG. 18, the image forming apparatus 12 can use multiple external service providing systems 30.

<Functional Configuration>

Figure 19:
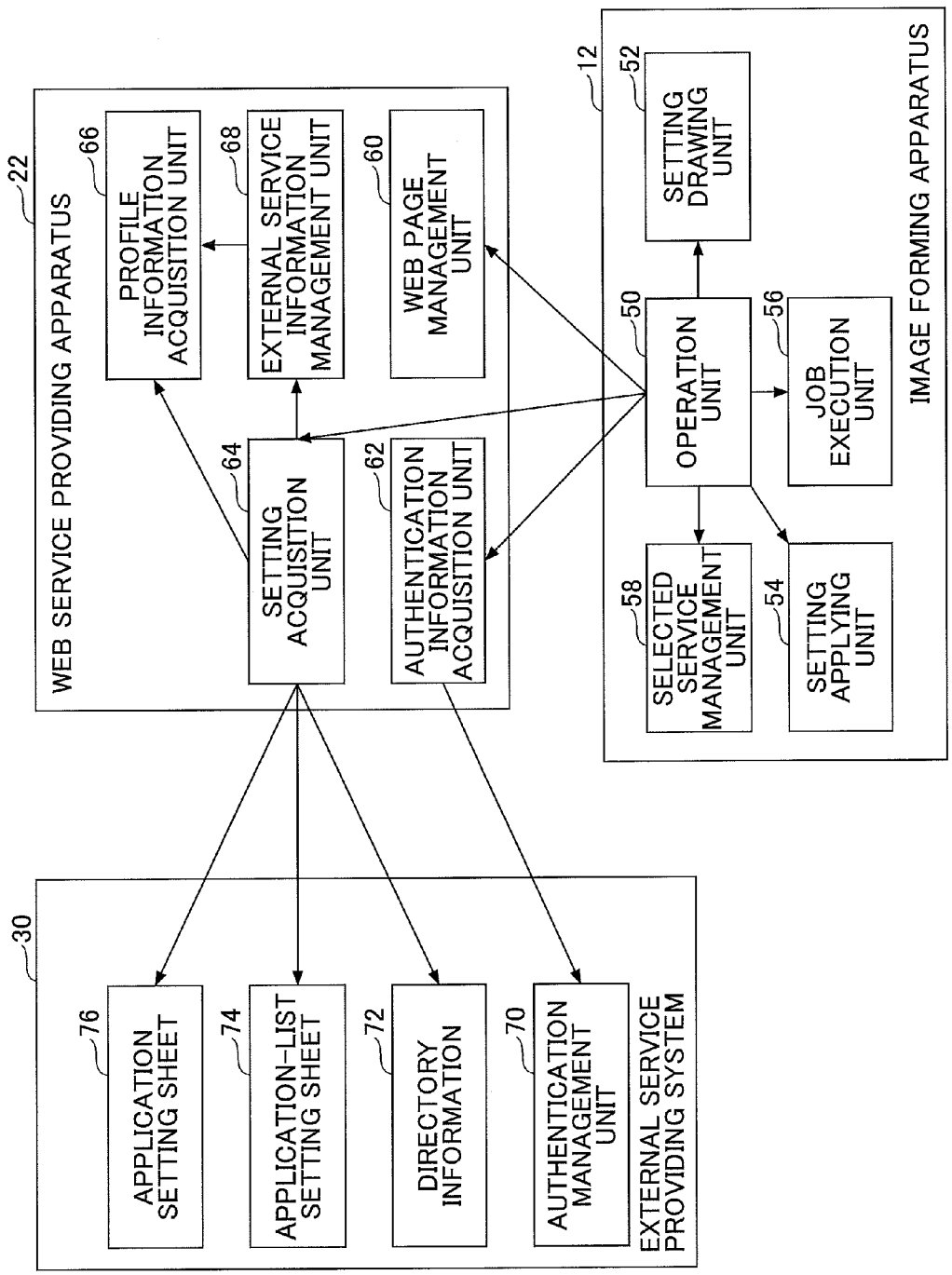
FIG. 19 is a block diagram illustrating an exemplary functional configuration of the information processing system according to the second embodiment.

FIG. 19 is a block diagram illustrating an exemplary functional configuration of the information processing system 1A according to the second embodiment. The functional configuration of FIG. 19 is different from the functional configuration of FIG. 4 in that a selected service management unit 58 is added to the image forming apparatus 12, and an external service information management unit 68 is added to the Web service providing apparatus 22.

The selected service management unit 58 of the image forming apparatus 12 stores selected service information on one of the external service providing systems 30 that is selected by the user. The external service information management unit 68 stores external service information corresponding to the selected service information.

<Processes>

Exemplary processes performed in the information processing system 1A of the second embodiment are described below.

[User Operations]

Figure 20:
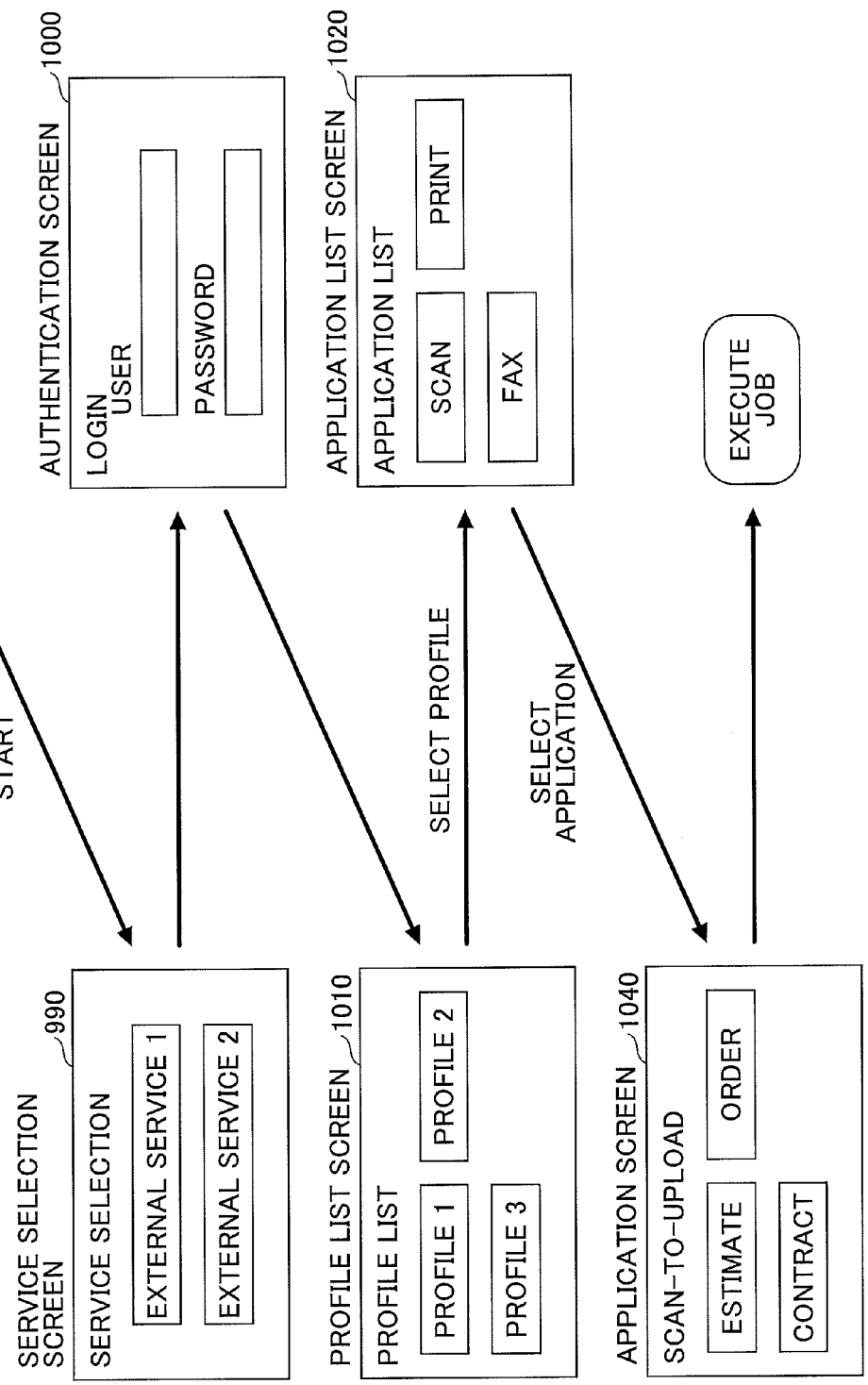
FIG. 20 is a drawing illustrating exemplary user operations in the information processing system according to the second embodiment.

For example, the user performs operations in a sequence as illustrated by FIG. 20 to execute a job. FIG. 20 is a drawing illustrating exemplary user operations in the information processing system 1A according to the second embodiment. In the information processing system 1A of the second embodiment, each application of the image forming apparatus 12 can use multiple external service providing systems 30.

The user starts an application of the image forming apparatus 12, and the application displays a service selection screen 990. The service selection screen 990 displays a list of external services supported by the started application. When the user selects an external service on the service selection screen 990, the started application displays the authentication screen 1000 for the selected external service. Operations performed by the user after the authentication screen 1000 are substantially the same as those in FIG. 5.

In the information processing system 1A of the second embodiment, directory information, application list information, and application setting information are obtained from the external service selected by the user on the service selection screen 990.

[Authentication-Information Acquisition Process]

Figure 21:
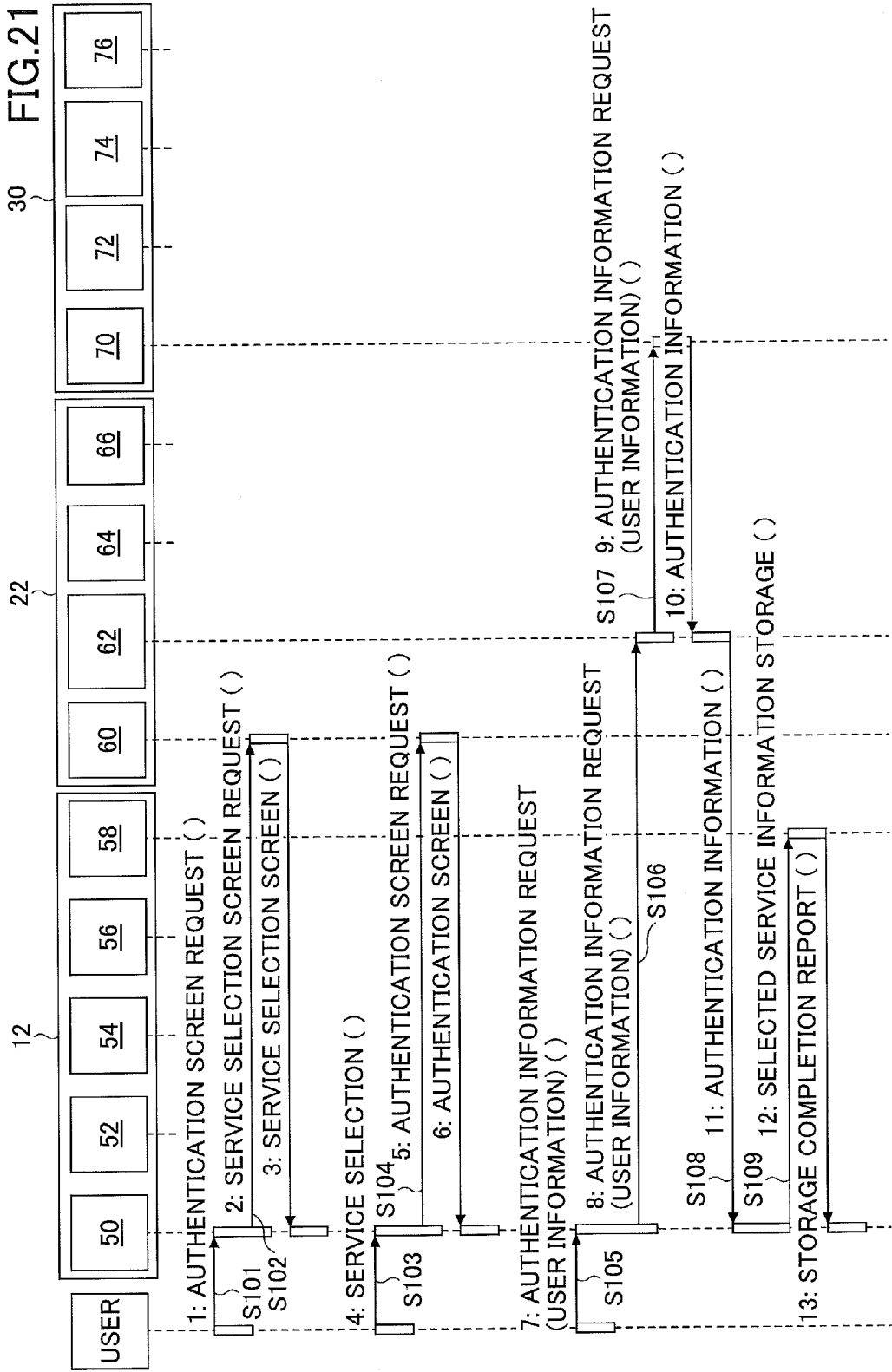
FIG. 21 is a sequence chart illustrating an example of an authentication-information acquisition process.

For example, the image forming apparatus 12 obtains authentication information of one of the external service providing systems 30 through a process as illustrated by FIG. 21. FIG. 21 is a sequence chart illustrating an example of an authentication-information acquisition process.

At step S101, the user operates the operation unit 50 of the image forming apparatus 12 to enter an authentication screen request to display the authentication screen 1000. At step S102, the operation unit 50 sends a service selection screen request to the Web page management unit 60 of the Web service providing apparatus 22, and obtains screen data of the service selection screen 990. Then, the operation unit 50 displays the service selection screen 990.

At step S103, the user selects an external service on the service selection screen 990. At step S103, the operation unit 50 sends an authentication screen request for the selected external service to the Web page management unit 60 of the Web service providing apparatus 22, and obtains screen data of the authentication screen 1000. Then, the operation unit 50 displays the authentication screen 1000.

At step S105, the user enters user information including a user name and a password on the authentication screen 1000 to request a login. At step S106, the operation unit 50 sends an authentication information request including the entered user information to the authentication information acquisition unit 62 of the Web service providing apparatus 22.

At step S107, the authentication information acquisition unit 62 of the Web service providing apparatus 22 sends an authentication information request including the user information to the authentication management unit 70 of the external service providing system 30 corresponding to the selected external service. When authentication based on the user information is successful, the authentication management unit 70 sends authentication information to the authentication information acquisition unit 62 of the Web service providing apparatus 22.

At step S108, the authentication information acquisition unit 62 sends the authentication information to the operation unit 50 of the image forming apparatus 12. At step S109, the operation unit 50 stores, in the selected service management unit 58, selected service information indicating the external service (or the external service providing system 30) selected by the user at step S103.

[Profile-List Acquisition Process]

Figure 22:
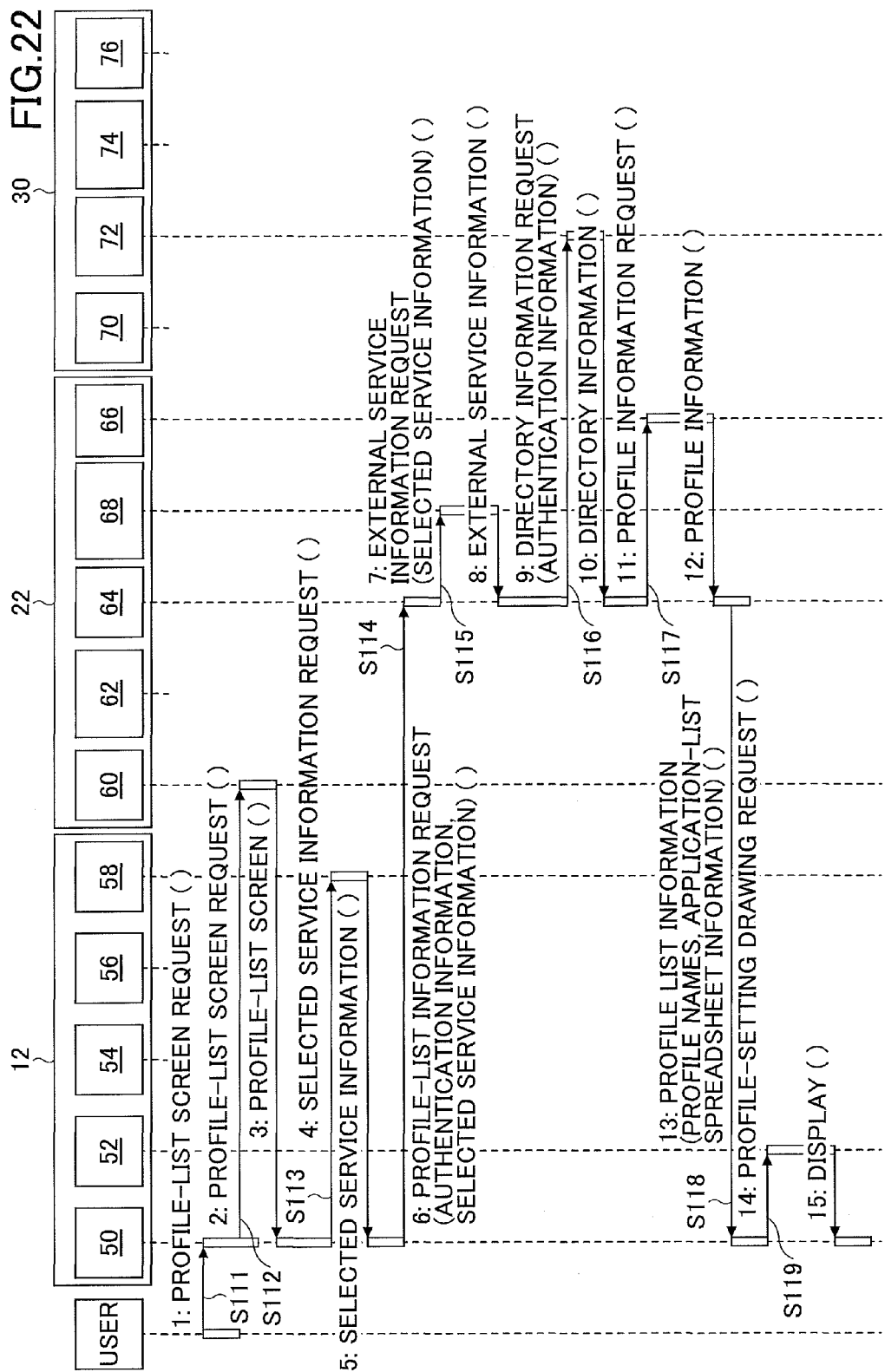
FIG. 22 is a sequence chart illustrating an example of a profile-list acquisition process.

The image forming apparatus 12 displays the profile-list screen 1010 through a process as illustrated by FIG. 22. FIG. 22 is a sequence chart illustrating an example of a profile-list acquisition process. At step S111, the user operates the operation unit 50 of the image forming apparatus 12 to enter a profile-list screen request to display the profile list screen 1010. At step S112, the operation unit 50 sends a profile-list screen request to the Web page management unit 60 of the Web service providing apparatus 22, and obtains screen data of the profile list screen 1010a. Then, the operation unit 50 displays the profile list screen 1010a.

At step S113, the operation unit 50 sends a selected service information request to the selected service management unit 58 to obtain selected service information from the selected service management unit 58. At step S114, the operation unit 50 sends a profile-list information request including the authentication information and the selected service information to the setting acquisition unit 64 of the Web service providing apparatus 22. At step S115, the setting acquisition unit 64 of the Web service providing apparatus 22 obtains external service information corresponding to the selected service information from the external service information management unit 68.

At step S116, the setting acquisition unit 64 sends a directory information request (a request for the directory information 72) including the authentication information to the external service providing system 30 corresponding to the obtained external service information. The external service providing system 30 sends directory information (e.g., directory information of FIG. 11 (A)) to the setting acquisition unit 64 of the Web service providing apparatus 22.

At step S117, the setting acquisition unit 64 sends a profile information request to the profile information extraction unit 66. The profile information extraction unit 66 extracts profile information as exemplified by FIG. 11 (B) from directory information as exemplified by FIG. 11 (A). The profile information extraction unit 66 sends the extracted profile information to the setting acquisition unit 64.

At step S118, the setting acquisition unit 64 of the Web service providing apparatus 22 sends profile list information to the operation unit 50 of the image forming apparatus 12 based on the profile information obtained from the profile information extraction unit 66.

At step S119, the operation unit 50 of the image forming apparatus 50 sends a profile-setting drawing request to cause the setting drawing unit 52 to display the profile list screen 1010 based on the profile list information.

[Application-List Acquisition Process]

Figure 23:
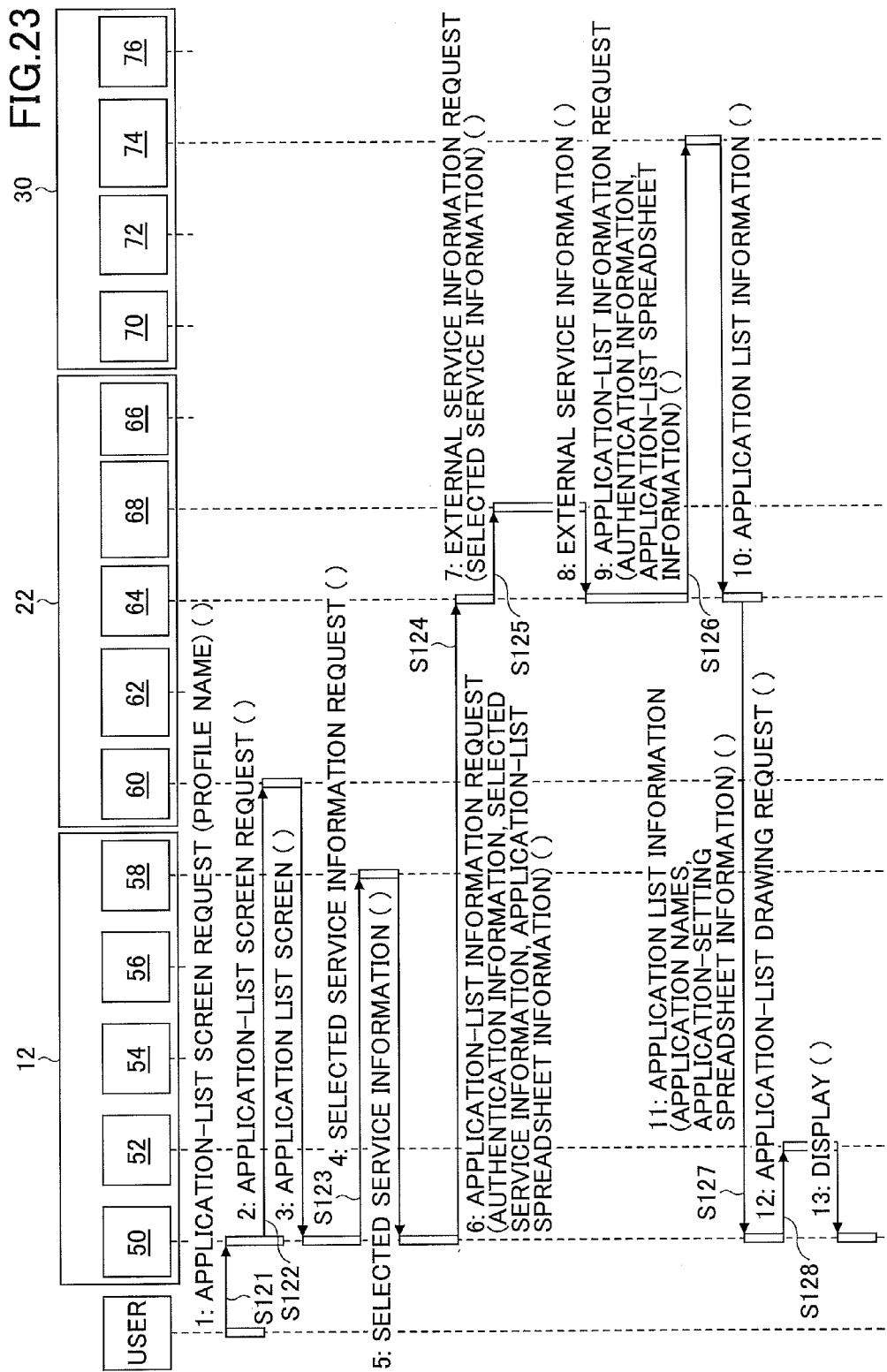
FIG. 23 is a sequence chart illustrating an example of an application-list acquisition process.

For example, the image forming apparatus 12 displays the application list screen 1020 through a process as illustrated by FIG. 23. FIG. 23 is a sequence chart illustrating an example of an application-list acquisition process. At step S121, the user operates the operation unit 50 of the image forming apparatus 12 to select a profile name on the profile list screen 1010 and thereby enter an application-list screen request.

At step S122, the operation unit 50 sends an application-list screen request to the Web page management unit 60 of the Web service providing apparatus 22, and obtains screen data of the application list screen 1020a. Then, the operation unit 50 displays the application list screen 1020a.

At step S123, the operation unit 50 sends a selected service information request to the selected service management unit 58 to obtain selected service information from the selected service management unit 58. At step S124, the operation unit 50 sends an application-list information request, which includes the authentication information, the selected service information, and application-list spreadsheet information corresponding to the selected profile name, to the setting acquisition unit 64 of the Web service providing apparatus 22. At step S125, the setting acquisition unit 64 of the Web service providing apparatus 22 obtains external service information corresponding to the selected service information from the external service information management unit 68.

At step S126, the setting acquisition unit 64 sends a request for the application-list setting sheet 74 together with the authentication information and the application-list spreadsheet information, to the external service providing system 30 corresponding to the obtained external service information. The external service providing system 30 sends the application-list setting sheet 74 to the setting acquisition unit 64 of the Web service providing apparatus 22.

At step S127, the setting acquisition unit 64 of the Web service providing apparatus 22 sends the application-list setting sheet 74 to the operation unit 50 of the image forming apparatus 12. At step S128, the operation unit 50 of the image forming apparatus 12 sends an application-list drawing request to cause the setting drawing unit 52 to display the application list screen 1020 based on the application-list setting sheet 74.

[Application-Screen Acquisition Process]

Figure 24:
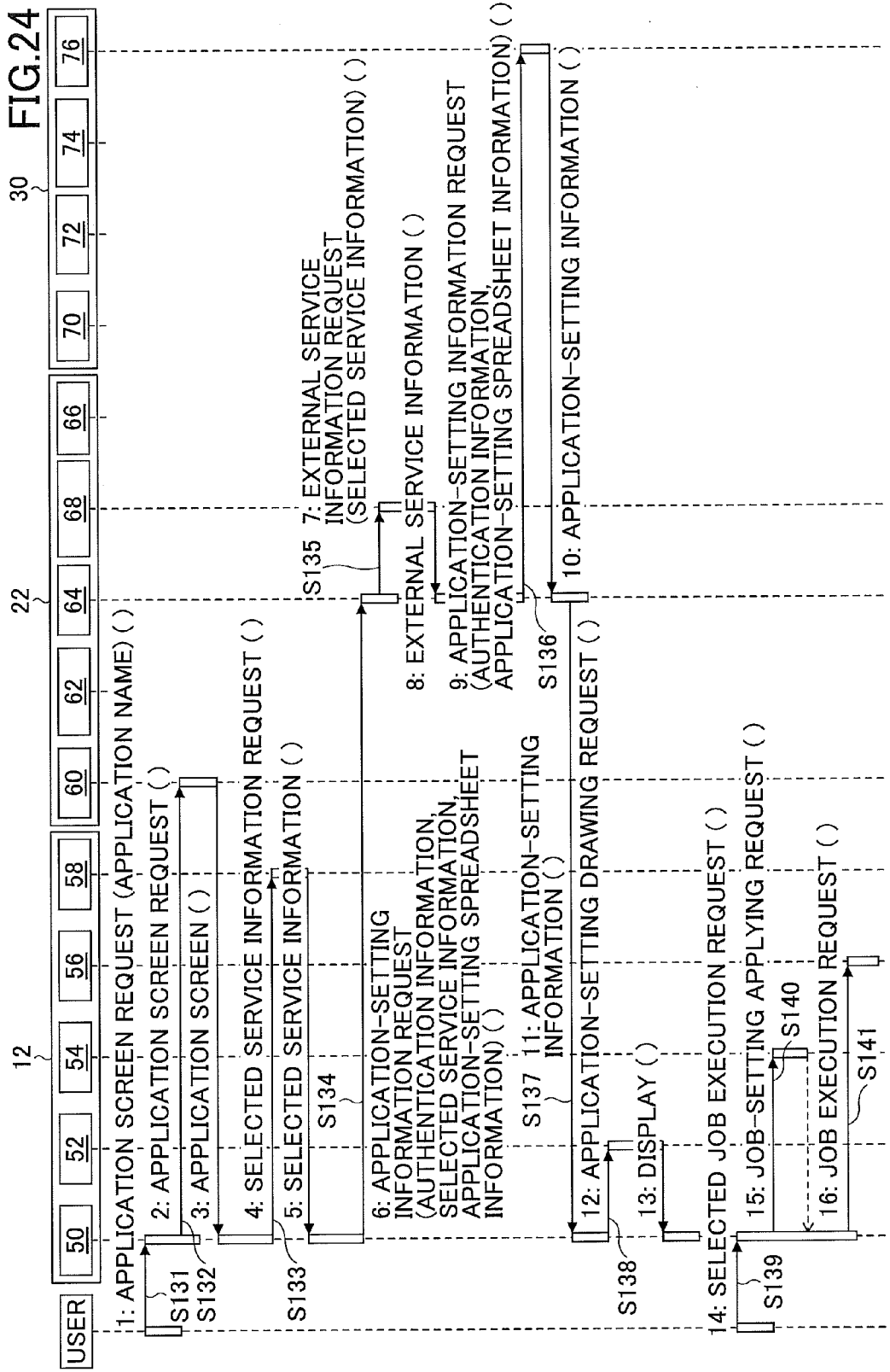
FIG. 24 is a sequence chart illustrating an example of an application-screen acquisition process.

For example, the image forming apparatus 12 displays the application screen 1040 through a process as illustrated by FIG. 24. FIG. 24 is a sequence chart illustrating an example of an application-screen acquisition process. At step S131, the user operates the operation unit 50 of the image forming apparatus 12 to select an application name on the application list screen 1020 and thereby enter an application screen request.

At step S132, the operation unit 50 sends an application screen request to the Web page management unit 60 of the Web service providing apparatus 22, and obtains screen data of the application screen 1040a. Then, the operation unit 50 displays the application screen 1040a. At step S133, the operation unit 50 sends a selected service information request to the selected service management unit 58 to obtain selected service information from the selected service management unit 58.

At step S134, the operation unit 50 sends an application-setting information request, which includes the authentication information, the selected service information, and application-setting spreadsheet information corresponding to the selected application name, to the setting acquisition unit 64 of the Web service providing apparatus 22. At step S135, the setting acquisition unit 64 of the Web service providing apparatus 22 obtains external service information corresponding to the selected service information from the external service information management unit 68.

At step S136, the setting acquisition unit 64 sends a request for the application setting sheet 76 together with the authentication information and the application-setting spreadsheet information, to the external service providing system 30 corresponding to the obtained external service information. The external service providing system 30 sends the application setting information to the setting acquisition unit 64 of the Web service providing apparatus 22.

At step S137, the setting acquisition unit 64 of the Web service providing apparatus 22 sends the application setting information to the operation unit 50 of the image forming apparatus 12. At step S138, the operation unit 50 of the image forming apparatus 12 displays the application screen 1040 based on the application setting information.

At step S139, the user operates the operation unit 50 of the image forming apparatus 12 to select a job setting name on the application screen 1040 and thereby enter a selected job execution request. At step S140, the operation unit 50 reads job setting information corresponding to the selected job setting name from the application setting sheet 76. Then, the operation unit 50 sends a job-setting applying request to cause the setting applying unit 54 to apply the read job setting information to job execution parameters. At step S141, the operation unit 50 sends a job execution request to cause the job execution unit 56 to execute a job based on the job execution parameters to which the job setting information is applied.

<Summary>

The second embodiment makes it possible to obtain application list information and application setting information from multiple external service providing systems 30 by using profile information identified based on the directory structure of the external storage of each of the external service providing systems 30.

Thus, the second embodiment can provide advantageous effects similar to those of the first embodiment while using multiple external service providing systems 30.

<<Third Embodiment>>

In the first and second embodiments, application list information and application setting information are obtained from the external service providing system 30 by using profile information identified based on the directory structure of the external storage of the external service providing system 30. In a third embodiment, configurations and methods for generating the directory structure of the external storage of the external service providing system 30 are described. In the third embodiment, descriptions of configurations and methods that are substantially the same as those of the first and second embodiments may be omitted.

<Functional Configuration>

Figure 25:
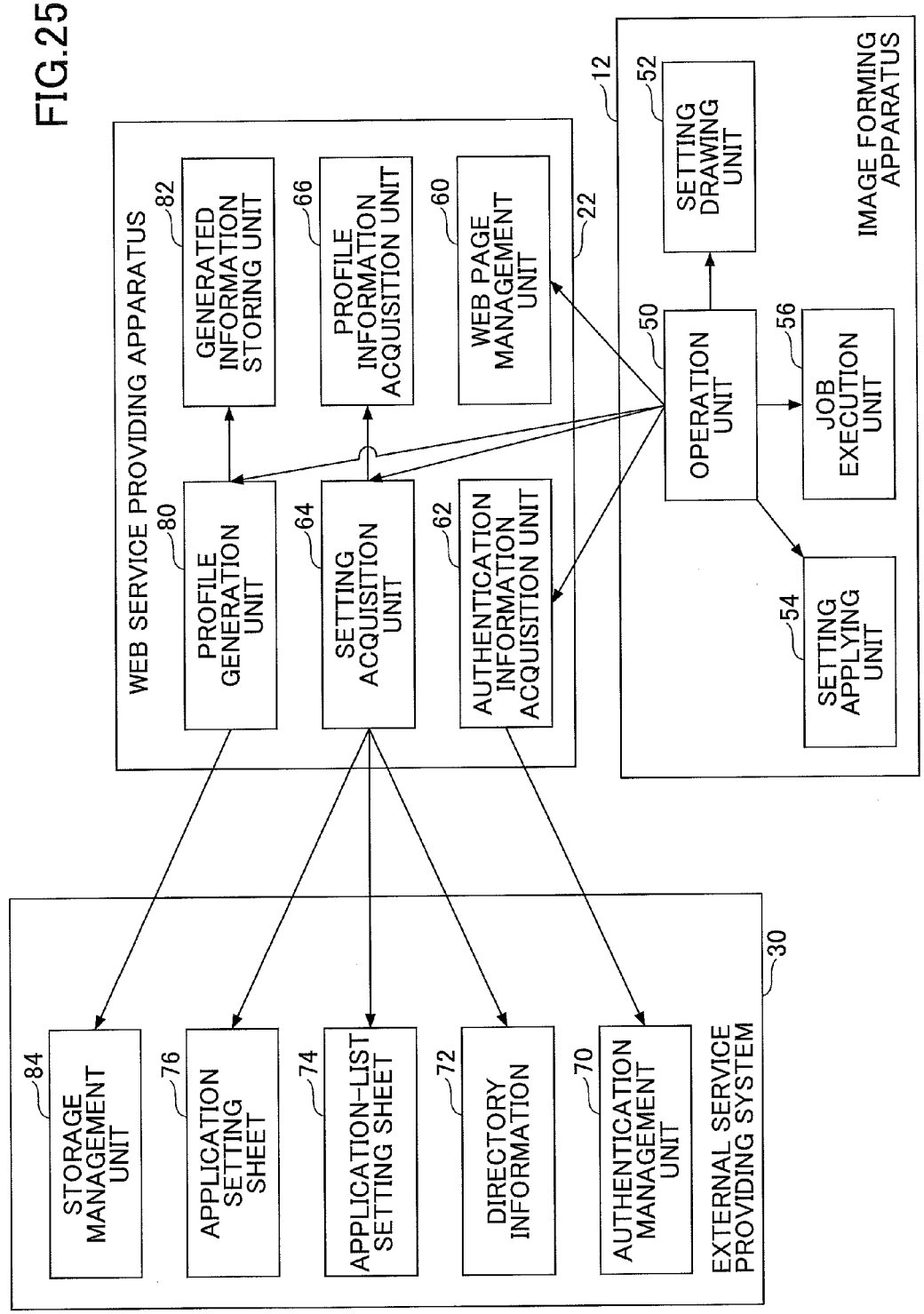
FIG. 25 is a block diagram illustrating an exemplary functional configuration of an information processing system according to a third embodiment.

The image forming apparatus 12, the Web service providing apparatus 22, and the external service providing system 30 of the third embodiment may have functional configurations as illustrated by FIG. 25. FIG. 25 is a block diagram illustrating an exemplary functional configuration of the information processing system 1 according to the third embodiment.

The functional configuration of FIG. 25 is different from the functional configuration of FIG. 4 in that a profile generation unit 80 and a generated information storing unit 82 are added to the Web service providing apparatus 22, and a storage management unit 84 is added to the external service providing system 30. The profile generation unit 80 of the Web service providing apparatus 22 receives a profile generation request from the operation unit 50 of the image forming apparatus 12, and generates the directory structure of the external storage of the external service providing system 30. The generated information storing unit 82 of the Web service providing apparatus 22 stores information necessary to generate the directory structure of the external storage of the external service providing system 30.

The storage management unit 84 of the external service providing system 30 manages the external storage that is provided as an external service. For example, based on a request from the profile generation unit 80, the storage management unit 84 generates folders and files in the external storage.

<Processes>

Exemplary processes performed in the information processing system 1 of the third embodiment are described below.

[User Operations]

Figure 26:
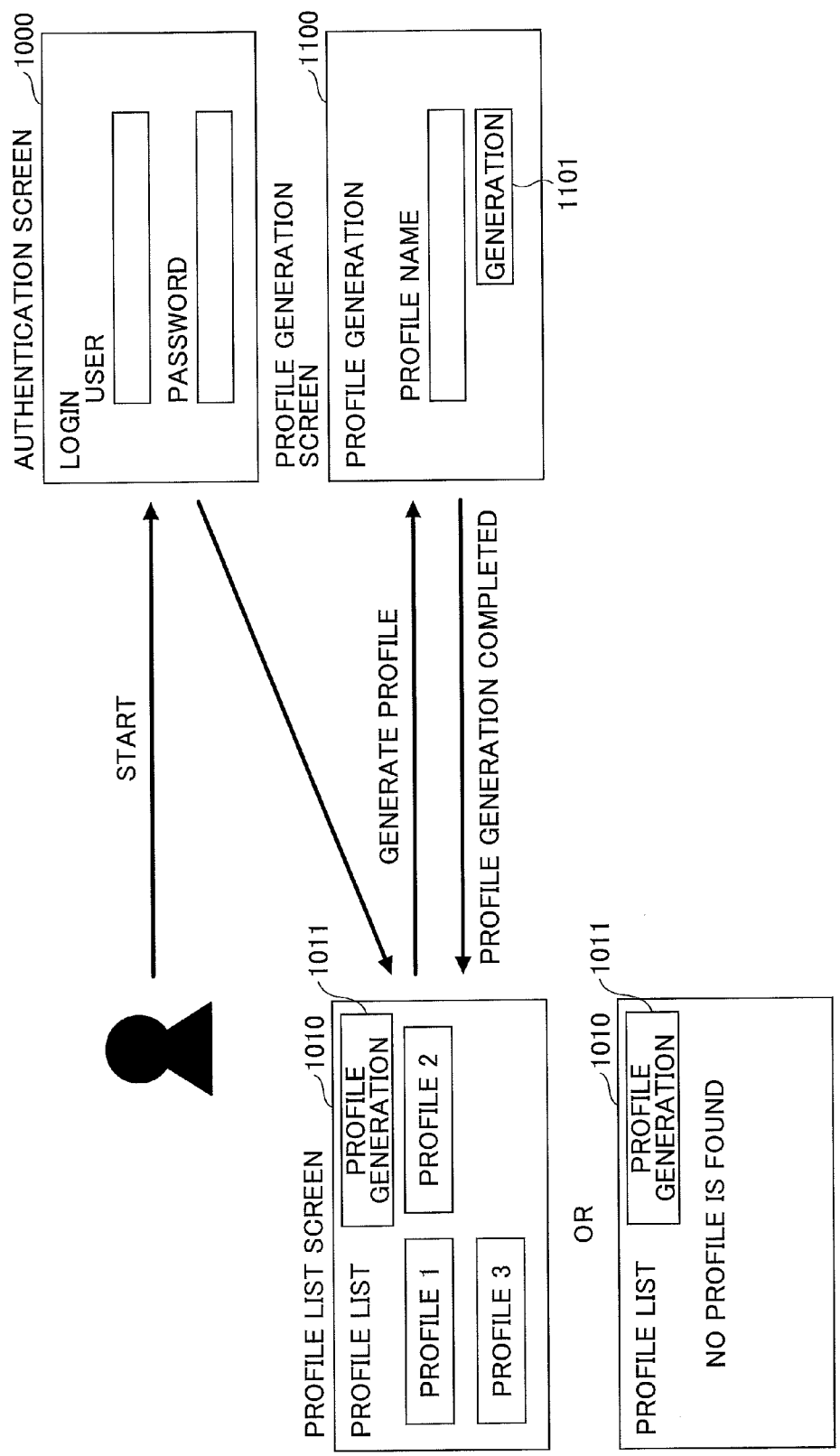
FIG. 26 is a drawing illustrating exemplary user operations in the information processing system according to the third embodiment.

For example, the user can generate a directory structure in the external storage of the external service providing system 30 through a process as illustrated by FIG. 26. FIG. 26 is a drawing illustrating exemplary user operations in the information processing system 1 according to the third embodiment.

The user starts an application of the image forming apparatus 12, and the application displays the authentication screen 1000. When the directory information 72, the application-list setting sheet 74, and the application setting sheet 76 to be used by the started application are accessible without authentication, the authentication screen 1000 is not displayed.

The user enters a user name and a password, which are examples of user information, on the authentication screen 1000 to request a login. The user name and the password used at this step may be unique to the user operating the image forming apparatus 12 or common to multiple users who use the image forming apparatus 12. Also, user information entered on the authentication screen 1000 may include other information such as an email address in addition to or instead of the user name and the password.

When the authentication is successful, the image forming apparatus 12 obtains profile-list information from the Web service providing apparatus 22 by using authentication information, and displays the profile-list screen 1010. Here, a profile indicates a group of application settings. In the example of FIG. 26, the profile list screen 1010 displays profile names "profile 1", "profile 2", and "profile 3".

The profile list displayed on the profile list screen 1010 is defined by the directory structure of the external storage of the external service providing system 30. The profile list information includes profile names and application-list spreadsheet information corresponding to each of the profile names.

The profile list screen 1010 in FIG. 26 also includes a profile generation button 1011. When the profile generation button 1011 is pressed by the user, the image forming apparatus 12 displays a profile generation screen 1100.

When no profile exists, the profile list screen 1010 may display a message such as "No profile is found". Alternatively, the image forming apparatus 12 may be configured to automatically display the profile generation screen 1100 when no profile exists.

The profile generation screen 1100 includes an input field for entering a profile name. When the user enters a profile name on the profile generation screen 1100 and presses a generation button 1101, the Web service providing apparatus 22 starts a profile generation process described later.

When the user presses the generation button 1101 without entering a profile name on the profile generation screen 1100, the Web service providing apparatus 22 may generate a profile with a default name. When generation of a profile is completed, the Web service providing apparatus 22 adds the profile name of the generated profile to the profile list screen 1010, and thereby reports the completion of generation of the profile to the user. Also, the Web service providing apparatus 22 may report the completion of generation of the profile to the user via email.

[Directory Structure]

Figure 27:
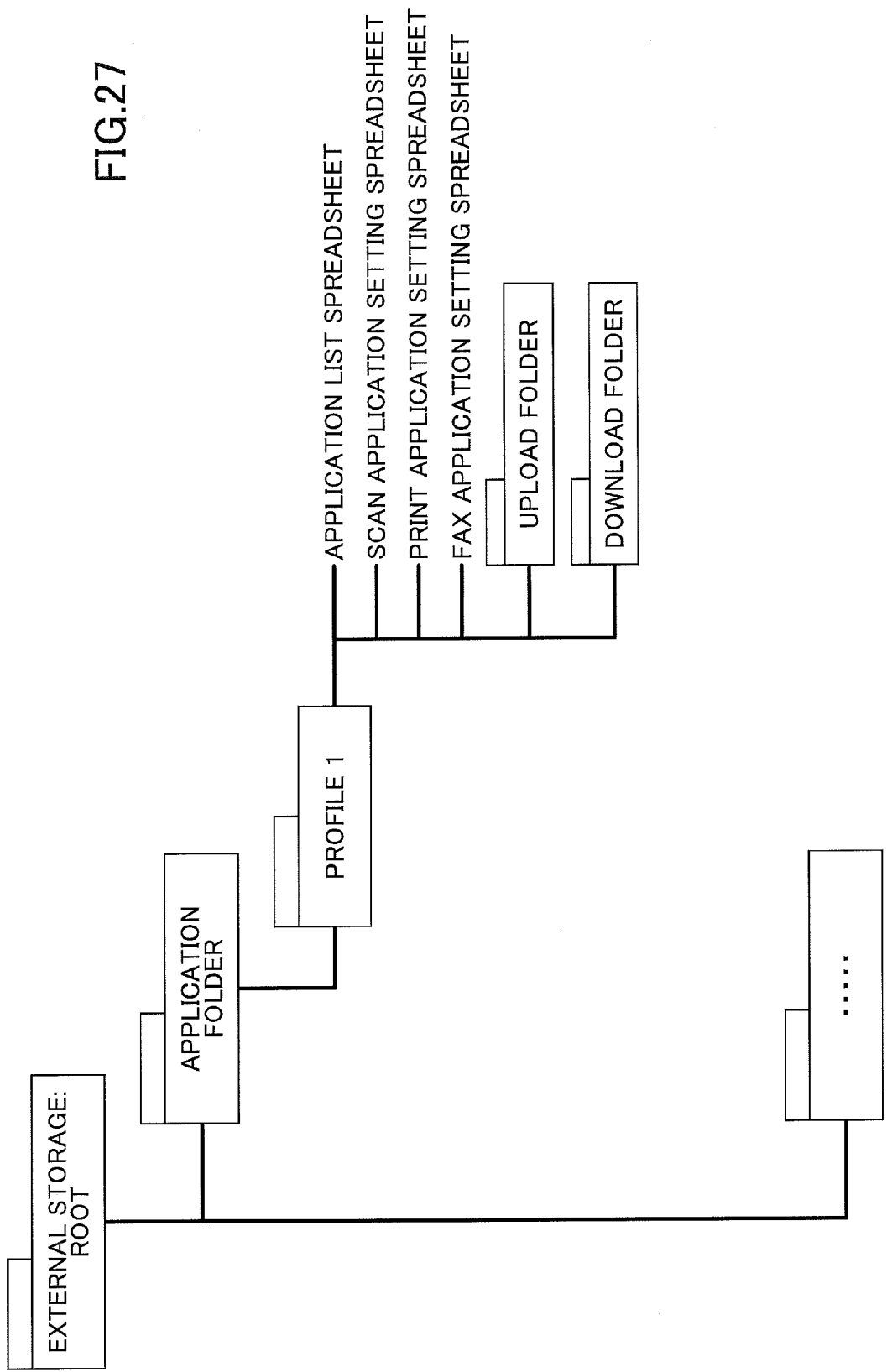
FIG. 27 is a drawing illustrating an exemplary directory structure of an external storage provided by an external service providing system.

FIG. 27 illustrates an exemplary directory structure generated in the external storage of the external service providing system 30.

In the directory structure of FIG. 27, a specific folder with a specific name "application folder" is provided directly under the root of the external storage provided by the external service providing system 30. When a specific spreadsheet with a specific name "application list spreadsheet" exists in a nonspecific folder that has any name and is in the application folder, the nonspecific folder is identified as a profile folder, and the name of the nonspecific folder is used as a profile name.

In the example of FIG. 27, a profile 1 folder containing the application-list spreadsheet is identified as a profile folder.

Also, the name "profile 1" of the profile folder is used as a profile name displayed on the profile-list screen 1010.

With the directory structure of FIG. 27, the information processing system 1 of the third embodiment can control the access to folders and spreadsheets, and can easily limit the use of profiles and application settings. As illustrated in FIG. 27, the profile folder may contain an upload folder for storing uploaded files and a download folder for storing files to be downloaded.

[Outline of Profile Generation Process]

Figure 28:
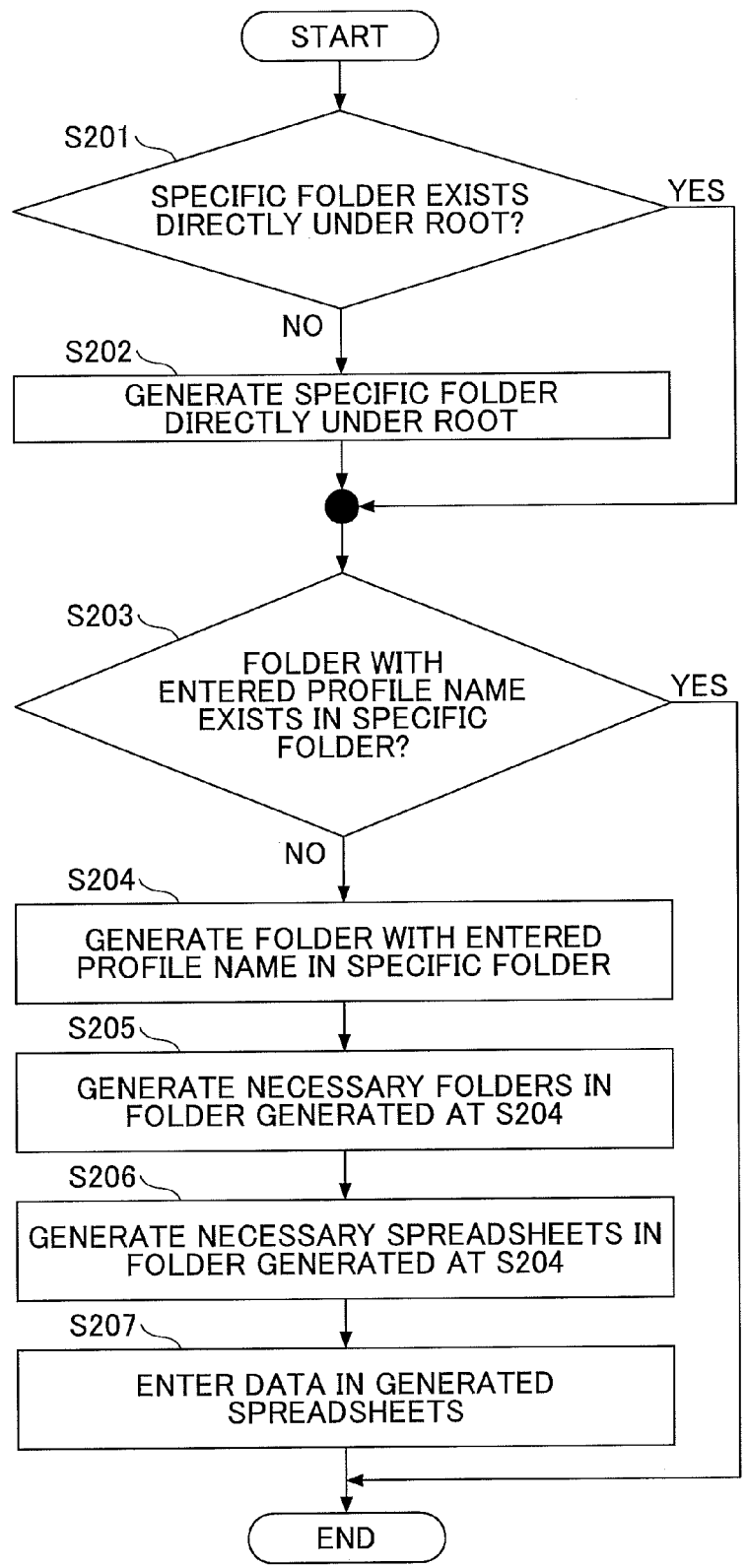
FIG. 28 is a flowchart illustrating an example of a profile generation process.

In the information processing system 1 of the third embodiment, for example, the directory structure illustrated by FIG. 27 may be generated through a process as illustrated by FIG. 28. FIG. 28 is a flowchart illustrating an example of a profile generation process. The profile generation process of FIG. 28 is started when the user enters a profile name on the profile generation screen 1100 of FIG. 26 and presses the generation button 1101.

At step S201, the profile generation unit 80 of the Web service providing apparatus 22 determines whether a specific folder with a specific name (e.g., "application folder" in FIG. 27) exists directly under the root of the external storage of the user.

When the specific folder does not exist directly under the root of the external storage of the user, the profile generation unit 80 generates the specific folder directly under the root of the external storage of the user at step S202, and proceeds to step S203. When the specific folder exists directly under the root of the external storage of the user, the profile generation unit 80 skips step S202 and proceeds to step S203.

At step S203, the profile generation unit 80 determines whether a folder with the profile name entered by the user on the profile generation screen 1100 exists in the specific folder directly under the root of the external storage of the user. When a folder with the entered profile name exists in the specific folder, the profile generation unit 80 ends the profile generation process.

When no folder with the entered profile name exists in the specific folder, the profile generation unit 80 proceeds to step S204. At step S204, the profile generation unit 80 generates a folder (profile folder) with the entered profile name in the specific folder.

At step S205, the profile generation unit 80 generates necessary folders such as an upload folder and a download folder in the folder generated at step S204. At step S206, the profile generation unit 80 generates necessary spreadsheets such as an application list spreadsheet and an application setting spreadsheet in the folder generated at step S204. Steps S205 and S206 may be performed concurrently.

At step S207, the profile generation unit 80 automatically enters data in the spreadsheets such as the application list spreadsheet and the application setting spreadsheet generated at step S206. In step S207, the profile generation unit 80 may receive data to be entered into the spreadsheets from the user. This data may include, for example, values in columns other than the column "application URL" in the application list spreadsheet of FIG. 7, and values in columns other than the column "storage location" in the application setting spreadsheet of FIG. 8. The values in the column "application URL" in the application list spreadsheet of FIG. 7 and the values in the column "storage location" in the application setting spreadsheet of FIG. 8 can be automatically obtained based the upload folder generated at step S205 and the spreadsheets generated at step S206.

[Profile-List Acquisition Process]

Figure 29:
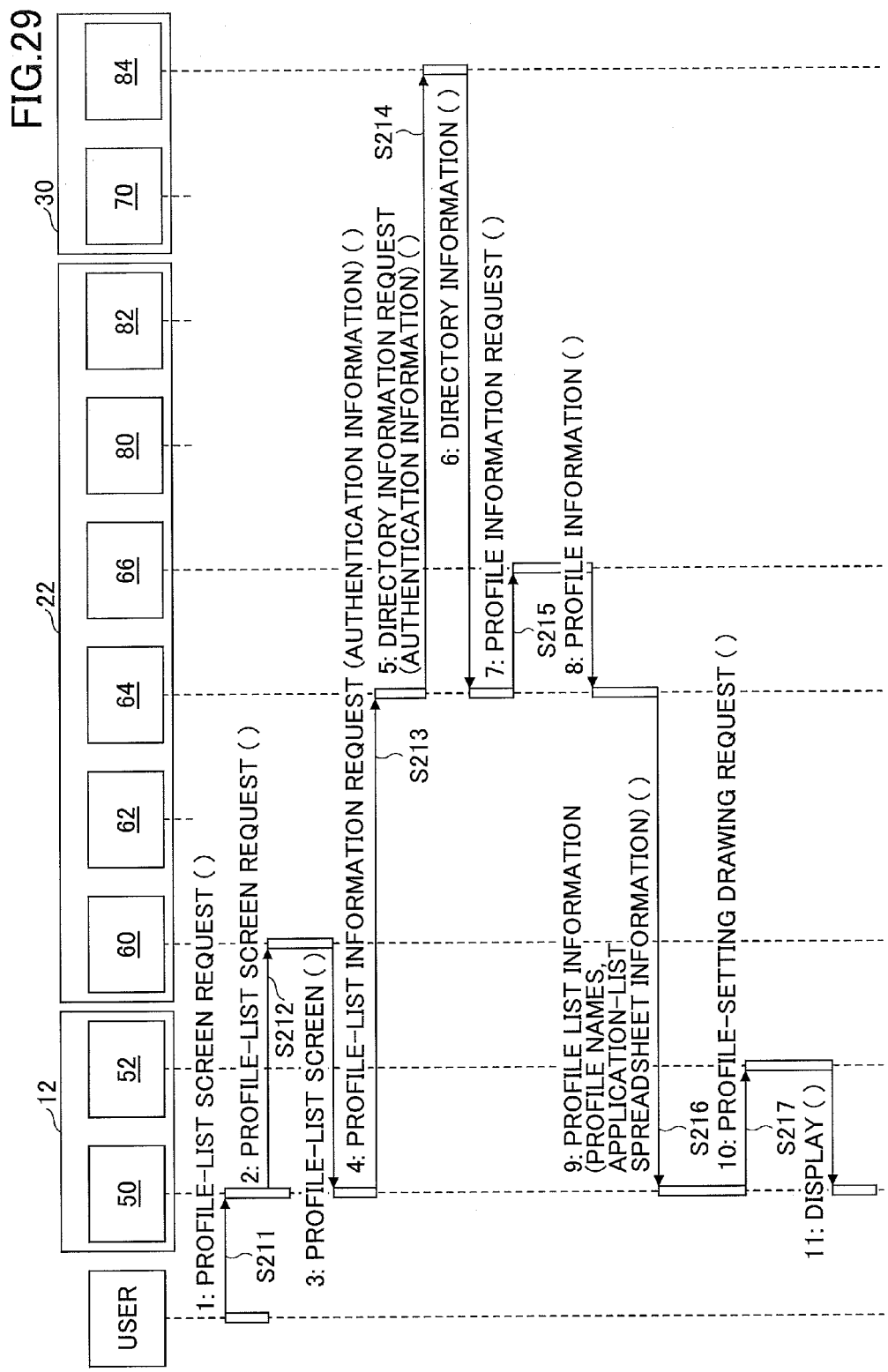
FIG. 29 is a sequence chart illustrating an example of a profile-list acquisition process.

For example, the image forming apparatus 12 displays the profile list screen 1010 through a process as illustrated by FIG. 29. FIG. 29 is a sequence chart illustrating an example of a profile-list acquisition process.

At step S211, the user operates the operation unit 50 of the image forming apparatus 12 to enter a profile-list screen request to display the profile list screen 1010 in FIG. 26.

At step S212, the operation unit 50 sends a profile-list screen request to the Web page management unit 60 of the Web service providing apparatus 22, and obtains screen data of the profile list screen 1010 of FIG. 26 excluding profile names. Then, the operation unit 50 displays the profile list screen 1010 of FIG. 26 excluding profile names.

At step S213, the operation unit 50 sends a profile-list information request including the authentication information to the setting acquisition unit 64 of the Web service providing apparatus 22. At step S214, the setting acquisition unit 64 of the Web service providing apparatus 22 sends a directory information request (a request for the directory information 72) including the authentication information to the storage management unit 84 of the external service providing system 30. The storage management unit 84 sends directory information (e.g., directory information of FIG. 11 (A)) to the setting acquisition unit 64 of the Web service providing apparatus 22.

At step S215, the setting acquisition unit 64 sends a profile information request to the profile information extraction unit 66. The profile information extraction unit 66 extracts profile information as exemplified by FIG. 11 (B) from directory information as exemplified by FIG. 11 (A). The profile information extraction unit 66 sends the extracted profile information to the setting acquisition unit 64.

At step S216, the setting acquisition unit 64 of the Web service providing apparatus 22 sends profile list information to the operation unit 50 of the image forming apparatus 12 based on the profile information obtained from the profile information extraction unit 66. At step S217, the operation unit 50 of the image forming apparatus 50 sends a profile-setting drawing request to cause the setting drawing unit 52 to display the profile list screen 1010 based on the profile list information.

[Profile Generation Process]

Figure 30:
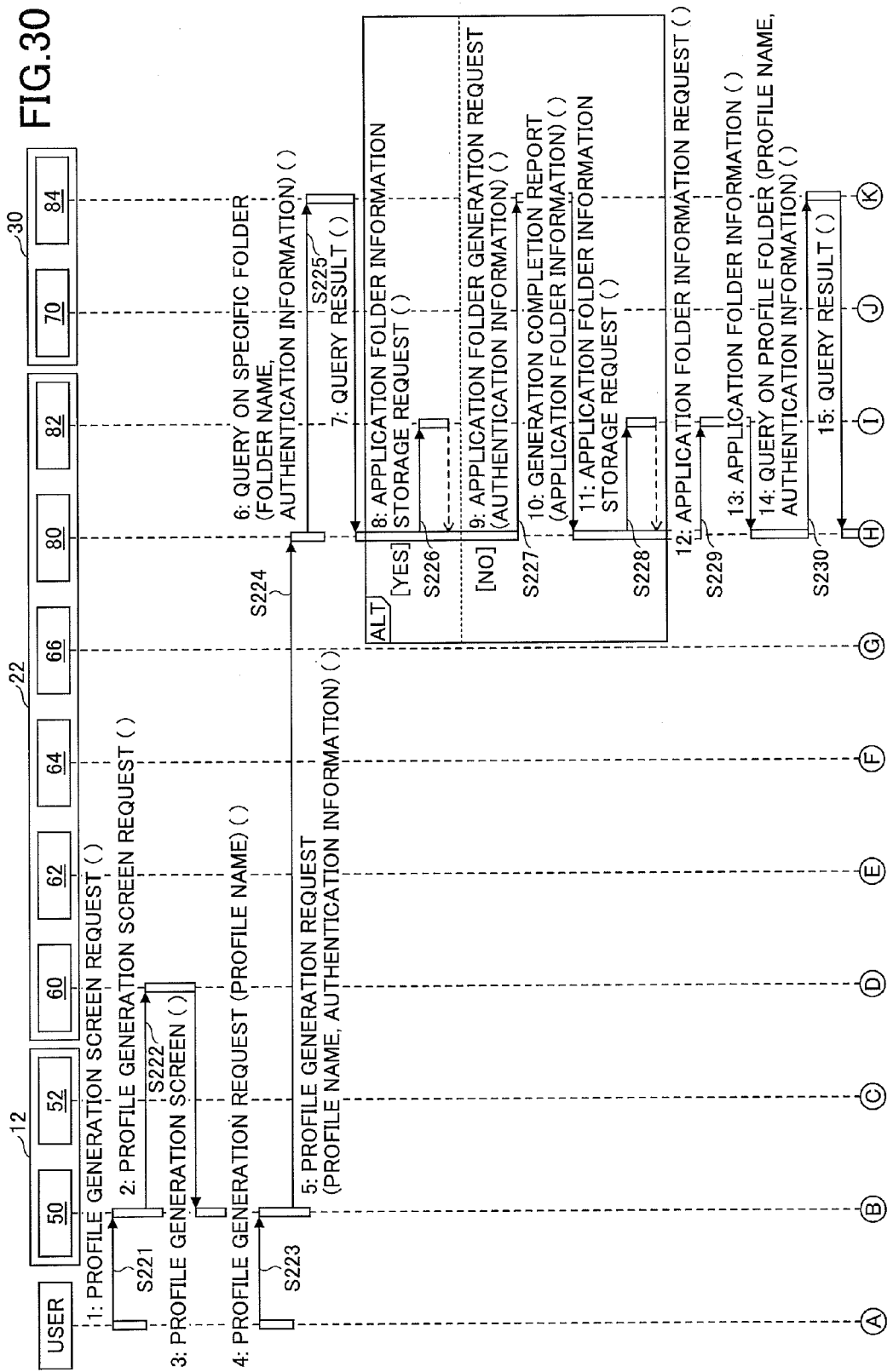
FIG. 30 is a sequence chart illustrating an example of a profile generation process.
Figure 31:
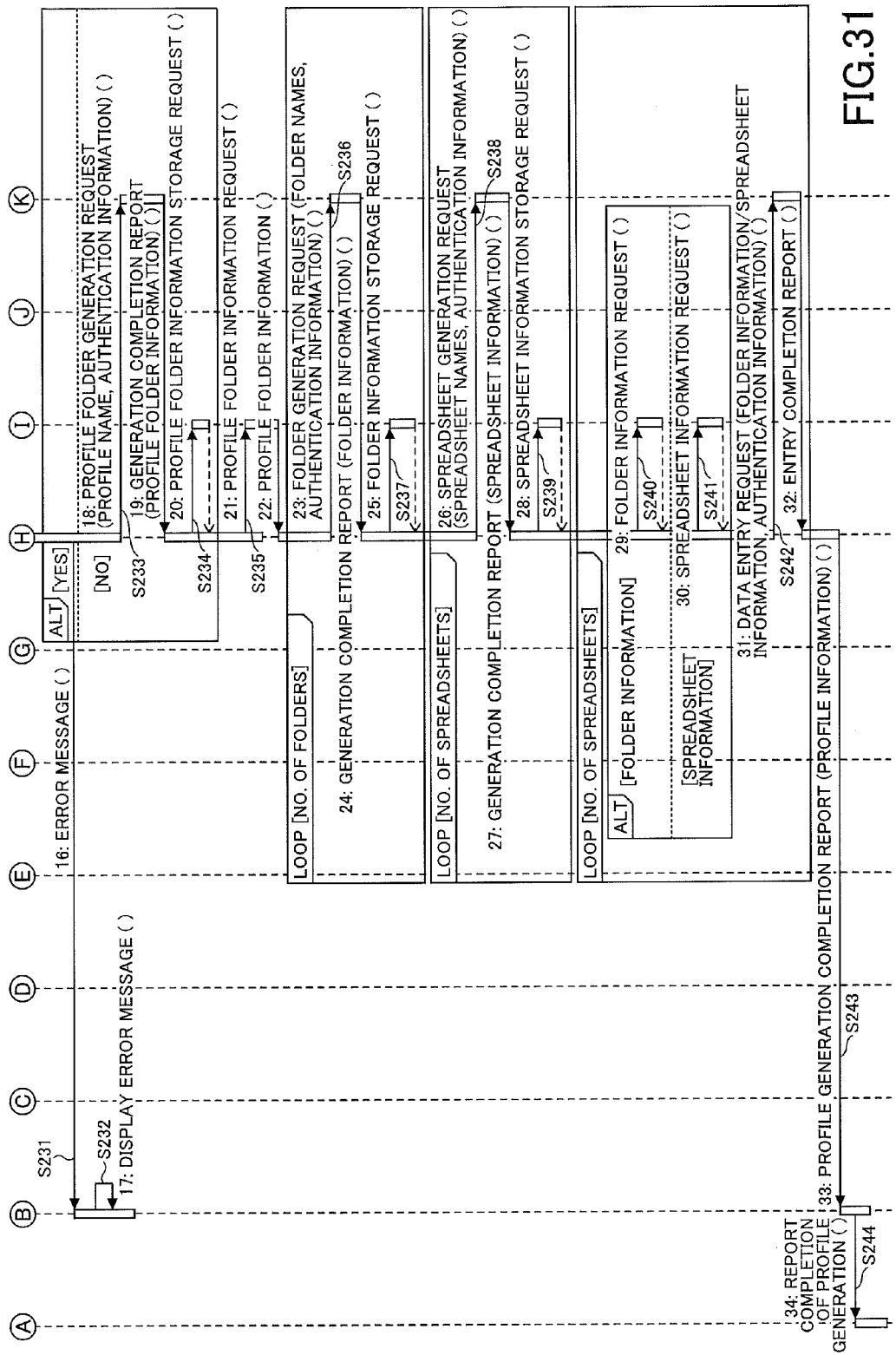
FIG. 31 is a sequence chart illustrating an example of a profile generation process.

In the information processing system 1 of the third embodiment, for example, the directory structure illustrated by FIG. 27 may be generated through a process as illustrated by FIGS. 30 and 31. FIGS. 30 and 31 are sequence charts illustrating an example of a profile generation process.

At step S221, the operation unit 50 of the image forming apparatus 12 receives a user operation to press the profile generation button 1011 of the profile list screen 1010. At step S222, the operation unit 50 sends a profile generation screen request to the Web page management unit 60 of the Web service providing apparatus 22, and obtains screen data of the profile generation screen 1100. Then, the operation unit 50 displays the profile generation screen 1100.

At step S223, the user enters a profile name on the profile generation screen 1100 and presses the generation button 1101 to enter a profile generation request. At step S224, the operation unit 50 sends a profile generation request including the entered profile name and the authentication information to the profile generation unit 80 of the Web service providing apparatus 22.

At step S225, the profile generation unit 80 queries the storage management unit 84 of the external service providing system 30 to determine whether a specific folder with a specific name (e.g., "application folder" in FIG. 27) exists directly under the root of the external storage of the user. The storage management unit 84 sends a query result, which indicates whether a specific folder with a specific name (e.g., "application folder" in FIG. 27) exists directly under the root of the external storage of the user, to the profile generation unit 80 of the Web service providing apparatus 22.

When the specific folder exists directly under the root of the external storage of the user, the profile generation unit 80 at step S226 requests the generated information storing unit 82 to store application folder information on the specific folder.

On the other hand, when the specific folder does not exist directly under the root of the external storage of the user, the profile generation unit 80 proceeds to step S227. At step S227, the profile generation unit 80 requests the storage management unit 84 of the external service providing system 30 to generate the specific folder directly under the root of the external storage of the user. The storage management unit 84 sends application folder information on the generated specific folder (application folder) to the profile generation unit 80 of the Web service providing apparatus 22.

At step S228, the profile generation unit 80 requests the generated information storing unit 82 to store the application folder information. At step S229 after step S226 or S228, the profile generation unit 80 obtains the application folder information from the generated information storing unit 82.

At step S230, the profile generation unit 80 queries the storage management unit 84 of the external service providing system 30 to determine whether a folder (profile folder) with the profile name entered by the user on the profile generation screen 1100 exists directly under the application folder. The storage management unit 84 sends a query result, which indicates whether a folder with the profile name entered by the user on the profile generation screen 1100 exists directly under the application folder, to the profile generation unit 80 of the Web service providing apparatus 22.

When a folder with the entered profile name exists directly under the application folder, the profile generation unit 80 proceeds to step S231. At step S231, the profile generation unit 80 sends, to the operation unit 50 of the image forming apparatus 12, an error message indicating that a folder with the entered profile name already exists. At step S232, the operation unit 50 displays the error message indicating that a folder with the entered profile name already exists.

When no folder with the entered profile name exists directly under the application folder, the profile generation unit 80 proceeds to step S233. At step S233, the profile generation unit 80 requests the storage management unit 84 of the external service providing system 30 to generate a folder (profile folder) with the entered profile name in the application folder (specific folder) directly under the root of the external storage of the user. The storage management unit 84 sends profile folder information on the generated folder (profile folder) to the profile generation unit 80 of the Web service providing apparatus 22.

At step S234, the profile generation unit 80 requests the generated information storing unit 82 to store the profile folder information. At step S235 after step S232 or S234, the profile generation unit 80 obtains the profile folder information from the generated information storing unit 82.

Steps S236 and S237 are repeated for the number of folders necessary for an application. At step S236, the profile generation unit 80 requests the storage management unit 84 of the external service providing system 30 to generate necessary folders such as an upload folder and a download folder in the profile folder generated at step S233.

The storage management unit 84 sends folder information on the generated folders to the profile generation unit 80 of the Web service providing apparatus 22. At step S237, the profile generation unit 80 requests the generated information storing unit 82 to store the folder information on the generated folders. Steps S238 and S239 are repeated for the number of spreadsheets necessary for an application.

At step S238, the profile generation unit 80 requests the storage management unit 84 of the external service providing system 30 to generate necessary spreadsheets such as an application list spreadsheet and an application setting spreadsheet in the profile folder generated at step S233.

The storage management unit 84 sends spreadsheet information on the generated spreadsheets to the profile generation unit 80 of the Web service providing apparatus 22. At step S239, the profile generation unit 80 requests the generated information storing unit 82 to store the spreadsheet information on the generated spreadsheets.

The folder information on the folders generated at step S236 and the spreadsheet information on the spreadsheets generated at step S238 are entered into the spreadsheets at steps S240 through S242. Steps S240 through S242 are repeated for the number of spreadsheets necessary for an application.

When entering the folder information on the folders generated at step S236 into one of the spreadsheets, the profile generation unit 80, at step S240, obtains the folder information from the generated information storing unit 82. When entering the spreadsheet information on the spreadsheets generated at step S238 into one of the spreadsheets, the profile generation unit 80, at step S241, obtains the spreadsheet information from the generated information storing unit 82.

At step S242, the profile generation unit 80 requests the storage management unit 84 to enter the folder information or the spreadsheet information into one of the spreadsheets such as the application list spreadsheet and the application setting spreadsheet generated at step S238.

For example, at step S242, the profile generation unit 80 automatically requests the storage management unit 84 to enter values in the column "application URL" in the application list spreadsheet of FIG. 7 or values in the column "storage location" in the application setting spreadsheet of FIG. 8. At step S243, the profile generation unit 80 sends a profile generation completion report including profile information to the operation unit 50 of the image forming apparatus 12.

At step S244, the operation unit 50 reports the completion of generation of the profile to the user by, for example, adding the profile name of the generated profile to the profile list screen 1010. Also, the profile generation unit 80 may report the completion of generation of the profile to the user via email.

<Summary>

The third embodiment makes it possible to easily generate the directory structure of the external storage of the external service providing system 30 used in the first and second embodiments.

<<Fourth Embodiment>>

In the third embodiment, necessary spreadsheets such as an application list spreadsheet and an application setting spreadsheet are newly generated in the profile generation process. On the other hand, in a profile generation process according to a fourth embodiment, existing spreadsheets are copied to generate necessary spreadsheets. In the fourth embodiment, descriptions of configurations and methods that are substantially the same as those of the third embodiment may be omitted.

<Functional Configuration>

Figure 32:
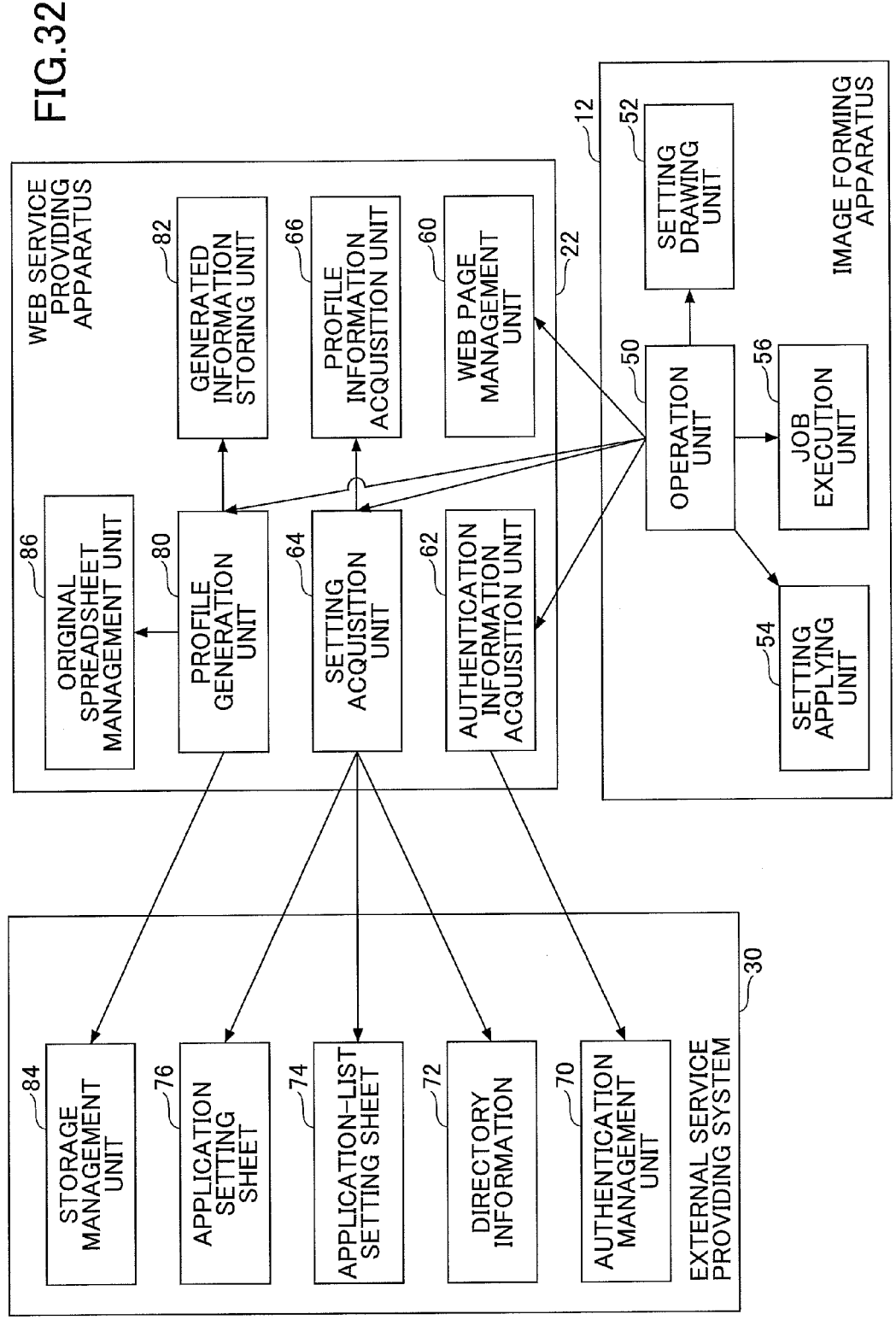
FIG. 32 is a block diagram illustrating an exemplary functional configuration of an information processing system according to a fourth embodiment.

FIG. 32 is a block diagram illustrating an exemplary functional configuration of the information processing system 1 according to the fourth embodiment. The functional configuration of FIG. 32 is different from the functional configuration of FIG. 25 in that an original spreadsheet management unit 86 is added to the Web service providing apparatus 22. The original spreadsheet management unit 86 manages original spreadsheets to be copied.

<Processes>

Exemplary processes performed in the information processing system 1 of the fourth embodiment are described below.

[Outline of Profile Generation Process]

Figure 33:
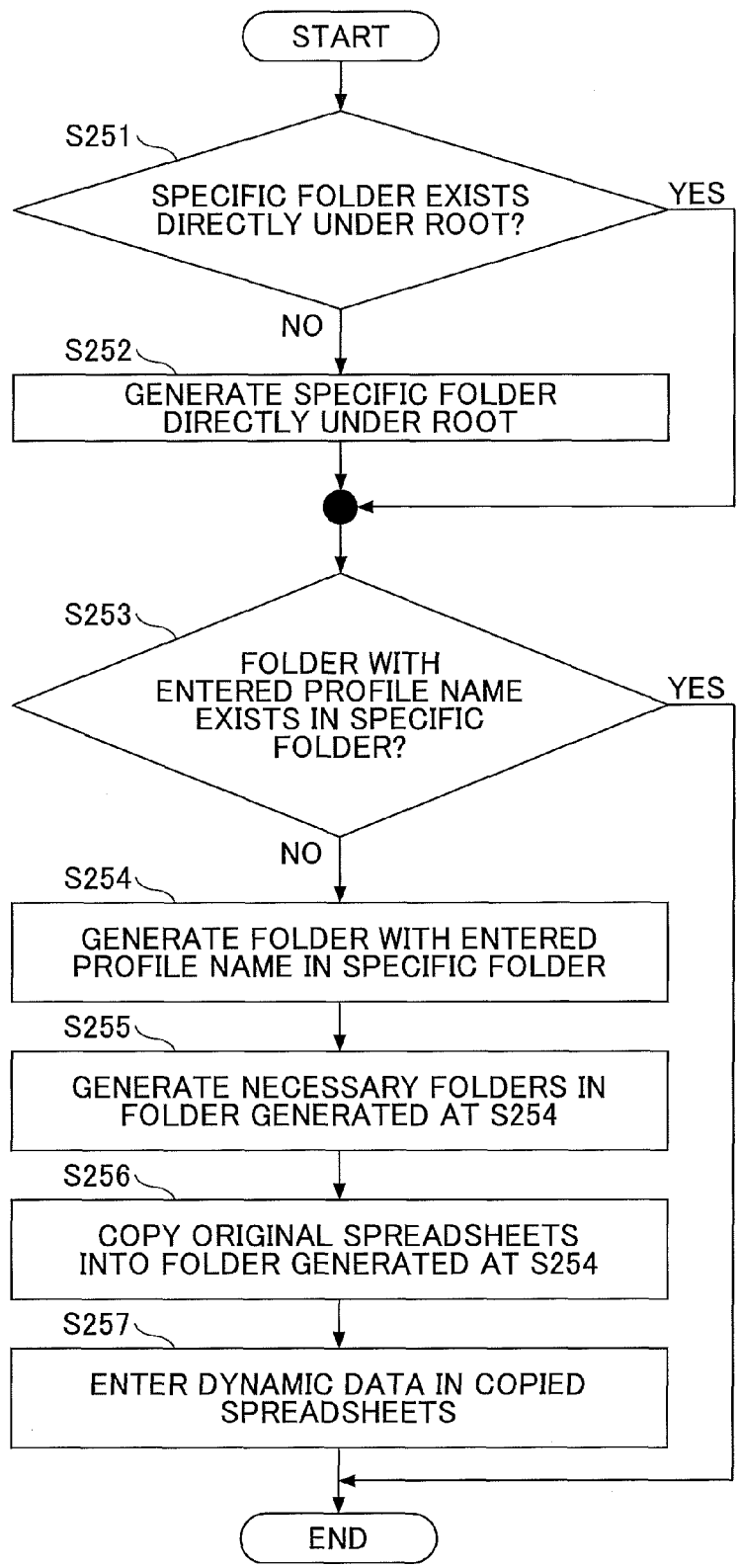
FIG. 33 is a flowchart illustrating an example of a profile generation process.

In the information processing system 1 of the fourth embodiment, for example, the directory structure illustrated by FIG. 27 may be generated through a process as illustrated by FIG. 33. FIG. 33 is a flowchart illustrating an example of a profile generation process. Steps S251 through S255 of FIG. 33 are substantially the same as steps S201 through S205 of FIG. 28 described in the third embodiment.

At step S256, the profile generation unit 80 obtains original spreadsheets from the original spreadsheet management unit 86. Then, the profile generation unit 80 copies the original spreadsheets such as an application list spreadsheet and an application setting spreadsheet into the folder generated at step S254.

At step S257, the profile generation unit 80 automatically enters dynamic data in the copied spreadsheets. The dynamic data entered at step S257 may include, for example, values in the column "application URL" in the application list spreadsheet of FIG. 7, and values in the column "storage location" in the application setting spreadsheet of FIG. 8.

Data other than the dynamic data are entered beforehand in the original spreadsheets such as the application list spreadsheet and the application setting spreadsheet to reduce the data entry workload at step S257.

[Profile Generation Process]

Figure 34:
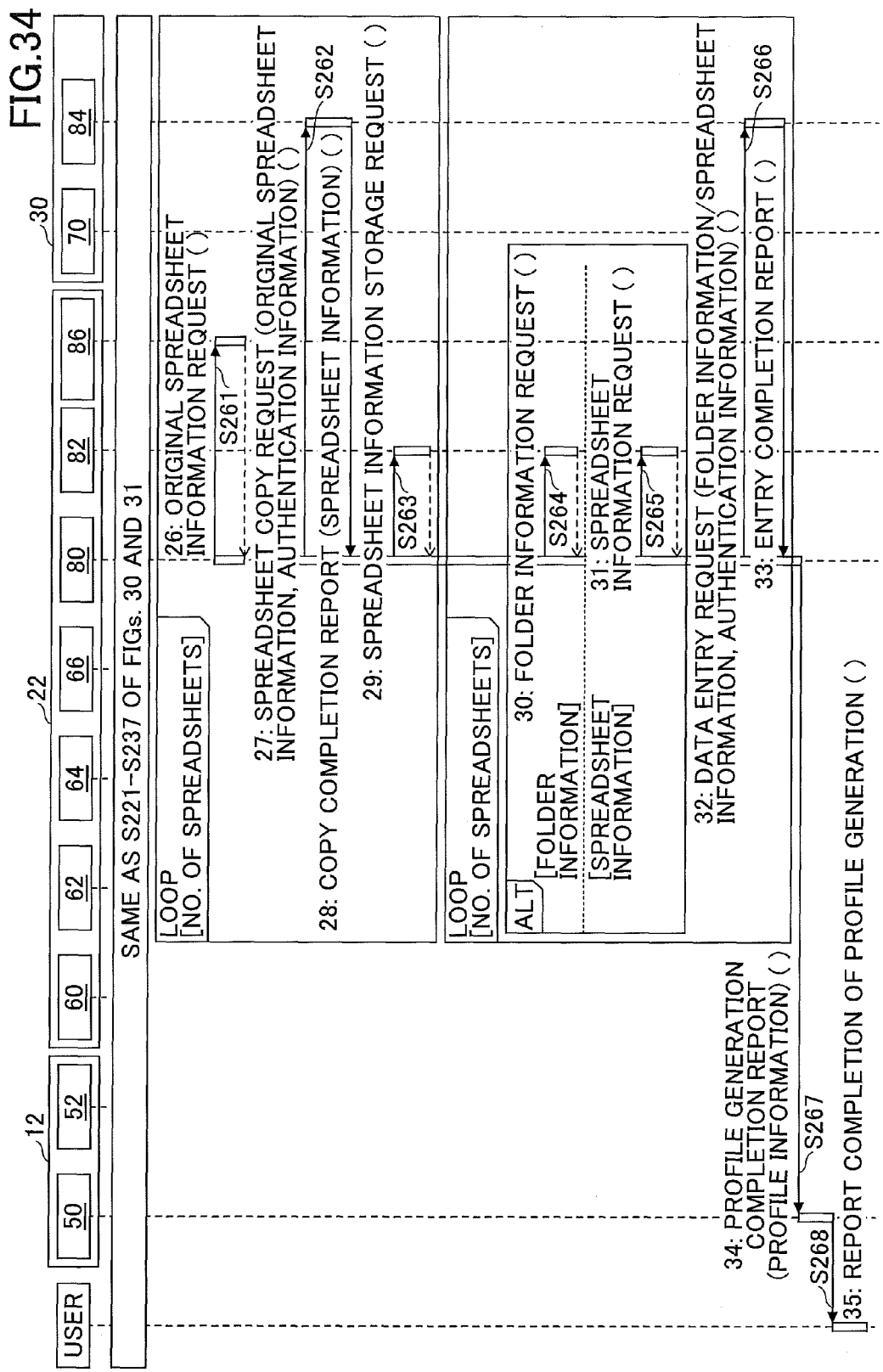
FIG. 34 is a sequence chart illustrating an example of a profile generation process.

In the information processing system 1 of the fourth embodiment, for example, the directory structure illustrated by FIG. 27 may be generated through a process as illustrated by FIG. 34. FIG. 34 is a sequence chart illustrating an example of a profile generation process.

In FIG. 34, after steps S221 through S237 of FIGS. 30 and 31 are performed, the process proceeds to step S261. At step S261, the profile generation unit 80 obtains original spreadsheets as exemplified by FIGS. 35 and 36 from the original spreadsheet management unit 86.

FIG. 35 is a drawing illustrating an example of an original application-list spreadsheet. FIG. 36 is a drawing illustrating an example of an original application-setting spreadsheet. In the original application-list spreadsheet of FIG. 35, cells in the column "application URL" are blank because values of those cells dynamically change (i.e., vary depending on each copy of the original application-list spreadsheet).

In the original application-setting spreadsheet of FIG. 36, cells in the column "storage location" are blank because values of those cells dynamically change.

At step S262, the profile generation unit 80 requests the storage management unit 84 of the external service providing system 30 to copy the original spreadsheets such as the original application-list spreadsheet and the original application-setting spreadsheet into the profile folder.

The storage management unit 84 sends spreadsheet information on the copied spreadsheets to the profile generation unit 80 of the Web service providing apparatus 22. At step S263, the profile generation unit 80 requests the generated information storing unit 82 to store the spreadsheet information on the copied spreadsheets.

The folder information on the generated folders and the spreadsheet information on the spreadsheets copied at step S262 are entered into the spreadsheets at steps S264 through S266. Steps S264 through S266 are repeated for the number of spreadsheets necessary for an application.

When entering the folder information on the generated folders into one of the spreadsheets, the profile generation unit 80, at step S264, obtains the folder information from the generated information storing unit 82. When entering the spreadsheet information on the spreadsheets copied at step S262 into one of the spreadsheets, the profile generation unit 80, at step S265, obtains the spreadsheet information from the generated information storing unit 82.

At step S266, the profile generation unit 80 requests the storage management unit 84 to enter dynamic data (e.g., application URLs or storage locations) into one of the spreadsheets such as the application list spreadsheet and the application setting spreadsheet copied at step S262.

For example, at step S266, the profile generation unit 80 automatically requests the storage management unit 84 to enter values in the column "application URL" in the application list spreadsheet of FIG. 35 or values in the column "storage location" in the application setting spreadsheet of FIG. 36. At step S267, the profile generation unit 80 sends a profile generation completion report including profile information to the operation unit 50 of the image forming apparatus 12.

At step S268, the operation unit 50 reports the completion of generation of the profile to the user by, for example, adding the profile name of the generated profile to the profile list screen 1010. Also, the profile generation unit 80 may report the completion of generation of the profile to the user via email.

<Summary>

The fourth embodiment makes it possible to more easily generate the directory structure of the external storage of the external service providing system 30 used in the first and second embodiments.

An information processing system, an information processing apparatus, and an information processing method according to embodiments of the present invention are described above. However, the present invention is not limited to the specifically disclosed embodiments, and variations and modifications may be made without departing from the scope of the present invention. The image forming apparatus 12 is an example of an electronic apparatus. The Web service providing apparatus 22 is an example of an information processing apparatus.

The profile information extraction unit 66 is an example of an identification unit. The profile generation unit 80 is an example of a generation unit.

What is claimed is:

1. An information processing system comprising:
 an information processing apparatus including a first processor configured to execute a first process; and
 an electronic apparatus connected via a network to the information processing apparatus and including a second processor configured to execute a second process, wherein the first process includes
identifying a location of a setting information file, which contains setting information used to execute a job at the electronic apparatus, based on hierarchical information indicating a hierarchical structure of files stored in a service providing system,
obtaining the setting information from the setting information file in the identified location, and
sending the obtained setting information to the electronic apparatus; and
the second process includes
applying the setting information received from the information processing apparatus to a setting of the job to be executed at the electronic apparatus,
wherein the identifying of the location includes
identifying a specific folder with a specific name in the hierarchical structure based on the hierarchical information;
identifying a list file in a nonspecific folder in the specific folder based on the hierarchical information, the list file including information on multiple setting information files; and
identifying the nonspecific folder including the list file as the location of the setting information file.

2. The information processing system according to claim 1, wherein the first process further includes
identifying the setting information file in the nonspecific folder based on the list file in the same nonspecific folder, the setting information file being different from the list file.

3. The information processing system according to claim 1, wherein
the list file is an application list spreadsheet containing a list of applications in association with the information on the setting information files; and
the setting information file is an application setting spreadsheet that is provided for one of the applications in the application list spreadsheet and contains the setting information.

4. The information processing system according to claim 1, wherein the second process further includes
when multiple nonspecific folders each containing the list file exist in the specific folder, displaying a list screen on the electronic apparatus to enable a user to select one of the nonspecific folders.

5. The information processing system according to claim 1, wherein the second process further includes
displaying an application list screen to enable a user to select an application from multiple applications based on the list file in the nonspecific folder.

6. The information processing system according to claim 5, wherein the second process further includes
displaying an application screen to enable a user to select one of jobs related to the selected application based on the setting information file that is in the nonspecific folder and corresponds to the selected application.

7. The information processing system according to claim 1, wherein the first process further includes
storing service information indicating the service providing system selected by a user from multiple service providing systems; and
obtaining the hierarchical information from the service providing system indicated by the stored service information.

8. The information processing system as claimed in claim 1, wherein the first process further includes
generating the hierarchical structure in the service providing system.

9. The information processing system according to claim 8, wherein the generating the hierarchical structure includes
receiving a request to generate the nonspecific folder from the electronic apparatus;
generating the nonspecific folder in the specific folder; and
generating the list file and the setting information file in the nonspecific folder.

10. The information processing system according to claim 9, wherein
the list file is an application list spreadsheet containing a list of applications in association with the information on the setting information files; and
the setting information file is an application setting spreadsheet that is provided for one of the applications in the application list spreadsheet and contains the setting information.

11. The information processing system according to claim 10, wherein the application list spreadsheet and the application setting spreadsheet are generated by copying original spreadsheets in which data other than dynamic data is entered beforehand.

12. The information processing system according to claim 9, wherein the second process further includes
displaying a generation screen on the electronic apparatus to enable a user to enter a name of the nonspecific folder and enter the request to generate the nonspecific folder.

13. An information processing apparatus connected via a network to an electronic apparatus, the information processing apparatus comprising:
a processor configured to execute a process including
identifying a location of a setting information file, which contains setting information used to execute a job at the electronic apparatus, based on hierarchical information indicating a hierarchical structure of files stored in a service providing system;
obtaining the setting information from the setting information file in the identified location; and
sending the obtained setting information to the electronic apparatus that applies the setting information to a setting of the job to be executed at the electronic apparatus,
wherein the identifying of the location includes
identifying a specific folder with a specific name in the hierarchical structure based on the hierarchical information;
identifying a list file in a nonspecific folder in the specific folder based on the hierarchical information, the list file including information on multiple setting information files; and
identifying the nonspecific folder including the list file as the location of the setting information file.

14. A method for an information processing system including an information processing apparatus and an electronic apparatus that are connected to each other via a network, the method comprising:
identifying, by the information processing apparatus, a location of a setting information file, which contains setting information used to execute a job at the electronic apparatus, based on hierarchical information indicating a hierarchical structure of files stored in a service providing system;

obtaining, by the information processing apparatus, the setting information from the setting information file in the identified location;

sending, by the information processing apparatus, the obtained setting information to the electronic apparatus; and applying, by the electronic apparatus, the setting information received from the information processing apparatus to a setting of the job to be executed at the electronic apparatus, wherein the identifying of the location includes
- identifying a specific folder with a specific name in the hierarchical structure based on the hierarchical information;
- identifying a list file in a nonspecific folder in the specific folder based on the hierarchical information, the list file including information on multiple setting information files; and
- identifying the nonspecific folder including the list file as the location of the setting information file.

* * * * *